(12) United States Patent
Miyajima et al.

(10) Patent No.: US 7,844,611 B2
(45) Date of Patent: Nov. 30, 2010

(54) TIME-SHIFT IMAGE DISTRIBUTION SYSTEM, TIME-SHIFT IMAGE DISTRIBUTION METHOD, TIME-SHIFT IMAGE REQUESTING APPARATUS, AND IMAGE SERVER

(75) Inventors: Yasushi Miyajima, Kanagawa (JP); Yoichiro Sako, Tokyo (JP); Toshiro Terauchi, Tokyo (JP); Makoto Inoue, Tokyo (JP); Masamichi Asukai, Kanagawa (JP); Mitsuru Takehara, Tokyo (JP); Takatoshi Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 447 days.

(21) Appl. No.: 11/384,952

(22) Filed: Mar. 20, 2006

(65) Prior Publication Data

US 2006/0250507 A1 Nov. 9, 2006

(30) Foreign Application Priority Data

Mar. 18, 2005 (JP) .............................. 2005-078623

(51) Int. Cl.
G06F 7/00 (2006.01)
G06F 17/30 (2006.01)
(52) U.S. Cl. ..................................... 707/749; 707/758
(58) Field of Classification Search ....................... 707/3
See application file for complete search history.

(56) References Cited

U.S. PATENT DOCUMENTS

| 5,335,072 | A | | 8/1994 | Tanaka et al. | |
|---|---|---|---|---|---|
| 6,161,102 | A | * | 12/2000 | Yanagihara et al. | ............. 707/3 |
| 2002/0051207 | A1 | * | 5/2002 | Ohkubo et al. | ............. 358/1.18 |
| 2002/0143762 | A1 | | 10/2002 | Boyd et al. | |
| 2002/0178293 | A1 | * | 11/2002 | Fukuda | ........................ 709/248 |
| 2003/0009493 | A1 | * | 1/2003 | Parker et al. | ............. 707/500.1 |
| 2004/0114176 | A1 | * | 6/2004 | Bodin et al. | ................ 358/1.15 |
| 2006/0025071 | A1 | * | 2/2006 | Yamazaki et al. | ........... 455/3.06 |
| 2006/0069681 | A1 | | 3/2006 | Lauper | |

FOREIGN PATENT DOCUMENTS

| EP | 0678816 | 10/1995 |
|---|---|---|
| EP | 1139239 | 10/2001 |
| EP | 1640879 | 3/2006 |
| JP | 09-200666 A | 7/1997 |
| JP | 9200666 | 7/1997 |

(Continued)

*Primary Examiner*—Cam Y T Truong
(74) *Attorney, Agent, or Firm*—Wolf, Greenfield & Sacks, PC

(57) ABSTRACT

A time-shift image distribution system includes an image server and a time-shift image requesting apparatus. The image server includes a first communication unit configured to carry out communications with the time-shift image requesting apparatus, an image database configured to store image data of captured images in association with meta information for image data of a captured image matching search-condition information, and an image providing unit configured to provide the image data of the captured image detected by the searching unit to the time-shift image requesting apparatus. The time-shift image requesting apparatus includes a second communication unit configured to carry out communications with the image server, and a unit configured to send a search request including information representing an imaging time and information for identifying a subject image as search-condition information to the image server via the second communication unit.

19 Claims, 13 Drawing Sheets

FOREIGN PATENT DOCUMENTS

| | | |
|---|---|---|
| JP | 2002-044506 A | 2/2002 |
| JP | 2003-323440 | 4/2002 |
| JP | 2002-354307 A | 12/2002 |
| JP | 2004-120625 A | 4/2004 |
| JP | 2004-220420 A | 8/2004 |
| WO | WO 2005/001714 | 1/2005 |

* cited by examiner

TIME-SHIFT IMAGE DISTRIBUTION SYSTEM, TIME-SHIFT IMAGE DISTRIBUTION METHOD, TIME-SHIFT IMAGE REQUESTING APPARATUS, AND IMAGE SERVER

CROSS REFERENCES TO RELATED APPLICATIONS

The present invention contains subject matter related to Japanese Patent Application JP 2005-078623 filed in the Japanese Patent Office on Mar. 18, 2005, the entire contents of which are incorporated herein by reference.

BACKGROUND OF THE INVENTION

1. Field of the Invention

The present invention relates to a time-shift image distribution system and a time-shift image distribution method for requesting an image server connected via a communication network to provide a time-shift image of a non-present time. The present invention also relates to a time-shift image requesting apparatus and an image server used in the system and method.

2. Description of the Related Art

Digital cameras for recording and saving captured images of objects on recording media such as card-shaped memories or optical disks in the form of digital image signals are commonly used. Such digital cameras are described, for example, in Japanese Unexamined Patent Application Publication No. 2004-343476 and Japanese Unexamined Patent Application Publication No. 2004-121981.

In the digital camera market, various manufacturers are producing a large number of new machines under competitions regarding resolution and processing speed. The digital cameras record and save images of present views currently displayed on viewfinders.

SUMMARY OF THE INVENTION

When capturing an image of an object, a user of a digital camera sometimes wishes to view a past image or a future image of the same object or in the same imaging direction at the same imaging location. However, with a digital camera currently available, it is not possible to obtain an image of the past or the future, not of the present. Also, no system or scheme currently exists for obtaining such a past image or for reserving a future image on the spot.

It is desired that a system that allows a user to obtain a past or future image of a specific subject be provided.

According to an embodiment of the present invention, there is provided a time-shift image distribution system. The time-shift image distribution system includes an image server; and a time-shift image requesting apparatus configured to request the image server to provide a time-shift image of a non-present time, the time-shift image requesting apparatus being connected to the image server via a communication network. The image server includes first communication means for carrying out communications with the time-shift image requesting apparatus via the communication network, an image database configured to store image data of captured images in association with meta information including information representing imaging times and information for identifying subject images captured, searching means for searching the image database on the basis of a search request received from the time-shift image requesting apparatus via the first communication means, the search request at least including information representing an imaging time and information for identifying a subject image as search-condition information, the searching means searching the image database for image data of a captured image matching the search-condition information, and image providing means for providing the image data of the captured image detected by the searching means to the time-shift image requesting apparatus. The time-shift image requesting apparatus includes second communication means for carrying out communications with the image server via the communication network, and means for sending a search request including information representing an imaging time and information for identifying a subject image as search-condition information to the image server via the second communication means.

According to the embodiment of the present invention, a user inputs information representing a non-present time, i.e., a past time or a future time, to the time-shift image requesting apparatus. Then, the time-shift image requesting apparatus generates a search request including information representing the time and information for identifying a subject image as search-condition information, and sends the search request to the image server via the communication network.

The image server searches the image database using at least the information representing the imaging time and the information for identifying a subject image, included in the search-condition information, to detect image data having corresponding meta information.

When the information representing the imaging time, included in the search-condition information, represents a past time, searching by the searching means is executed. When image data matching the search-condition information is detected, the image providing means sends the image data to the time-shift image requesting apparatus as a result of searching, for example, via the communication network.

Thus, the user of the time-shift image requesting apparatus can readily obtain a past image of a subject image by receiving the image data and, for example, displaying a corresponding image on a display screen.

On the other hand, when the information representing the imaging time, included in the search-condition information, represents a future time, the image server regards the search request as a search reservation request, and monitors whether image data matching the search-condition information exists in the image database. When image data matching the search-condition information becomes available at a future time, the image providing means provides the image data as a result of searching.

According to another embodiment of the present invention, there is provided a time-shift image distribution method executed by an image server and a time-shift image requesting apparatus connected via a communication network, the image server including an image database configured to accumulate image data of captured images in association with meta information including information representing imaging times and information for identifying subject images, in which the time-shift image requesting apparatus requests the image server to provide a time-shift image of a non-present time to receive the time-shift image from the image server. The time-shift image distribution method comprising the steps of establishing, by the time-shift image requesting apparatus, a communication path for carrying out communications with the image server via the communication network; sending, by the time-shift image requesting apparatus, a search request to the image server through the communication path established, the search request including information representing an imaging time and information for identifying a subject image as search-condition information; searching, by the image server, the image database for image data of a captured image matching search-condition information included in a search request received from the time-shift image requesting apparatus via the communication path, the search-condition information including information representing an imaging time and information for identifying a subject image; and providing, by the image server, the image data of the captured image, detected by the searching, to the time-shift image requesting apparatus.

According to another embodiment of the present invention, there is provided a time-shift image requesting apparatus, connected to an image server via a communication network, for requesting the image server to provide a time-shift image of a non-present time. The time-shift image requesting apparatus includes communication means for carrying out communications with the image server via the communication network; and means for sending a search request to the image server via the communication means, the search request including information representing an imaging time and information for identifying a subject image.

According to another embodiment of the present invention, there is provided an image server, connected to a time-shift image requesting apparatus via a communication network, for receiving a request for providing a time-shift image of a non-present time from the time-shift image requesting apparatus and providing the time-shift image to the time-shift image requesting apparatus. The image server includes communication means for carrying out communications with the time-shift image requesting apparatus via the communication network; an image database configured to accumulate image data of captured images in association with meta information including information representing imaging times and information for identifying subject images; searching means for searching the image database on the basis of a search request received from the time-shift image requesting apparatus via the communication means, the search request at least including information representing an imaging time and information for identifying a subject image as search-condition information, the searching means searching the image database for a captured image matching the search-condition information; and image providing means for providing image data of the captured image detected by the searching means to the time-shift image requesting apparatus.

According to these embodiments of the present invention, the user can readily obtain a past or future image of a specific subject image.

DESCRIPTION OF THE PREFERRED EMBODIMENTS

Now, a time-shift image distribution system, and an image server and a time-shift image requesting apparatus in the system according to an embodiment of the present invention will be described with reference to the drawings.

Figure 1:
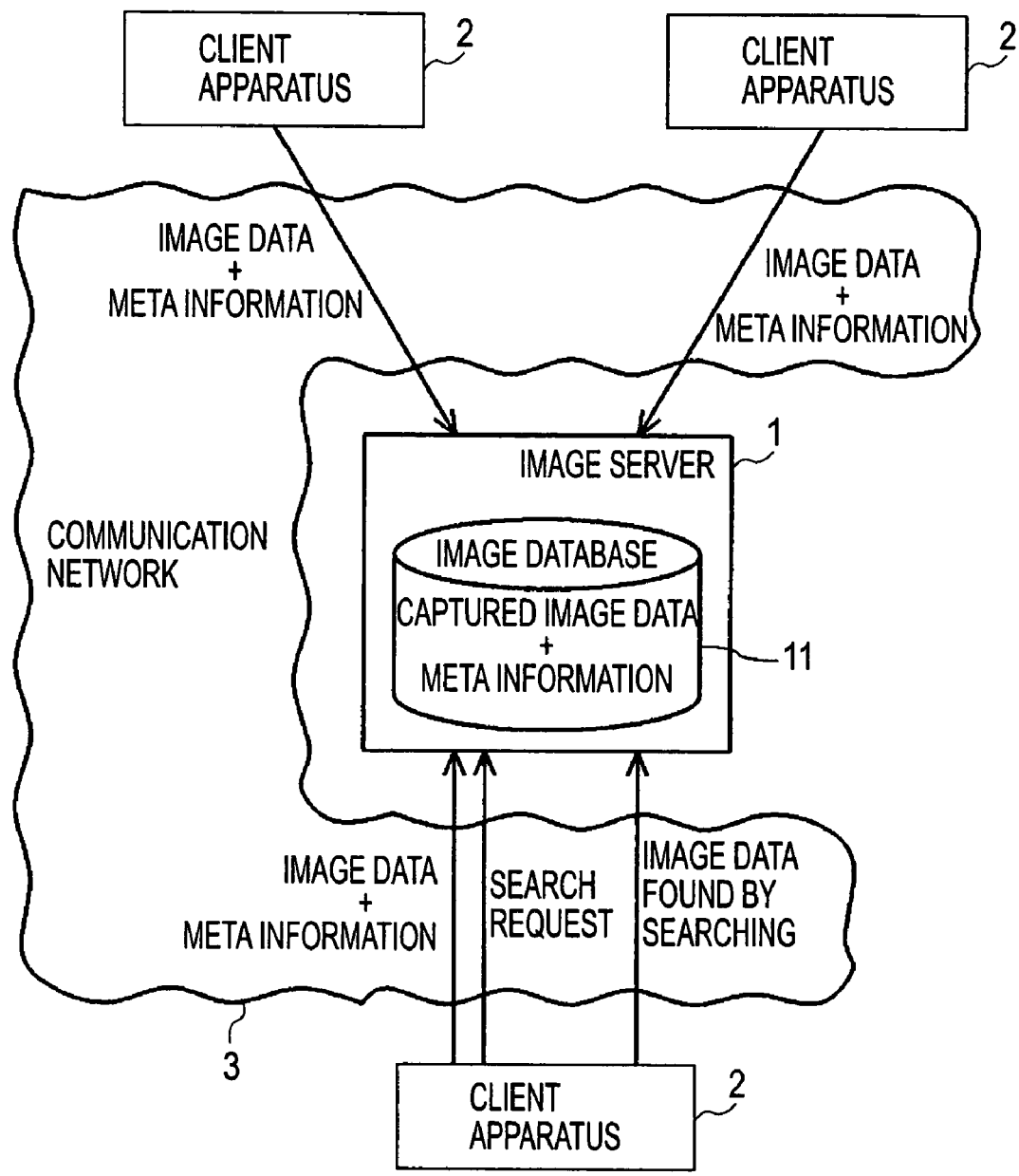
FIG. 1 is a block diagram for explaining an overview of a time-shift image distribution system according to an embodiment of the present invention.

FIG. 1 is a block diagram showing the overall configuration of a time-shift image distribution system according to an embodiment of the present invention.

Referring to FIG. 1, in the time-shift image distribution system, an image server 1 and a client apparatus 2 are connected to each other via a communication network 3, such as the Internet or a cellular phone network. The client apparatus 2 is a time-shift requesting apparatus according to an embodiment of the present invention.

The image server 1 includes an image database 11. In the image database 11, captured image data is stored in association with metadata. The metadata includes, for example, a time of imaging (year, month, day, hour, minute, and second), a location of imaging (geographical location and altitude), a direction of imaging, an angle of view, and a tilt angle of imaging (an upward or downward angle of the imaging direction with respect to a horizontal plane). Hereinafter, the angle of view and the angle of elevation or depression will be collectively referred to as a camera angle). In addition to these pieces of information, other information for identifying a subject captured image (subject image), for example, the name of a particular architecture, such as "Tokyo Tower", "Horyuji Temple", or "Kaminarimon", may be registered in association with an image including the architecture.

The names of these specific architectures may be manually input as information for identifying subject images. Alternatively, image recognition of a captured image is performed, and when an image including such a specific architecture is recognized, the name of the architecture is automatically registered as meta information in association with the image data.

The client apparatus 2 in this embodiment has a function of imaging, a function of displaying a captured image, and a function of carrying out network communications. An example of the client apparatus 2 is a camera-equipped cellular phone. Another example of the client apparatus 2 is an imaging device (digital camera or video camera) having a function of wireless communications. Yet another example of the client apparatus 2 is a camera-equipped personal digital assistant (PDA) or a camera-equipped personal computer.

In this embodiment, the client apparatus 2 has a function of uploading image data of a captured image of an object together with meta information generated by the client apparatus 2 to the image server 1. However, the client apparatus 2 in this embodiment is configured so that each user is allowed to determine whether to permit uploading of image data captured by the user to the image server 1. Thus, captured image data is uploaded to the image server 1 only when uploading is permitted.

As will be described later, the client apparatus 2 in this embodiment includes units for automatically obtaining meta information, such as a time of imaging (year, month, day, hour, minute, and second), a location of imaging (geographical position and altitude), a direction of imaging, and a camera angle. Furthermore, the client apparatus 2 in this embodiment includes a unit for inputting names of architectures for identifying subject images.

The client apparatus 2 in this embodiment is capable of sending a search request for an image of a past time or a future time, not of a present time, to the image server 1. That is, as will be described later, the client apparatus 2 includes a user interface for allowing a user to input a past time or a future time, and also includes an operation unit for sending a search request to the image server 1. In this embodiment, a search request is sent to the image server 1 by inputting a past time or a future time and pressing a shutter button on the operation unit.

That is, by inputting a past time or a future time and then pressing a shutter button, the user achieves an effect substantially equivalent to an effect of capturing an image at the past time or the future time. In response to the user's operation, the client apparatus 2 sends a search request for the image of the past or future to the image server 1. The search request sent from the client apparatus 2 includes information representing the past or future time and search-condition information such as a location of imaging, a direction of imaging, and a camera angle.

Furthermore, the user can input the names of specific architectures, such as "Tokyo Tower", "Kaminarimon", and "Horyuji Temple", as information for identifying a captured image relevant to a search request, so that the names of such specific architectures can be included in search-condition information.

Upon receiving a search request, the image server 1 analyzes search-condition information to determine whether the condition regarding the time of imaging specifies a past time or a future time. When the condition regarding the time of imaging specifies a future time, the image server 1 saves the search request as a search reservation request so that the search reservation request will be executed at the specified future time.

On the other hand, when the condition regarding the time of imaging specifies a past time, the image server 1 searches the image database 11 using the search-condition information received. When a relevant past image is detected by the searching, the image server 1 sends image data of the image detected to the client apparatus 2 at the source of the search request.

Upon receiving the image data detected by the searching, the client apparatus 2 displays the image corresponding to the image data on a display, such as a liquid crystal display (LCD), as if the image of the past time were captured by pressing a shutter button. At the same time, the client apparatus 2 records the image data on a recording medium for recording captured data, such as a card-shaped memory or an optical disk.

Furthermore, at this time, when it has been specified by the user that image data of a present view captured by the client apparatus 2 is to be also recorded, the image data captured at the present time is also recorded on the recording medium. At the client apparatus 2, instead of allowing the user to specify whether to record image data of an image captured at a present time, image data of an image captured at a present time may always be recorded.

Furthermore, when it has been permitted by the user at the client apparatus 2 to upload image data to the image server 1, the client apparatus 2 uploads image data actually captured at the present time by pressing a shutter button to the image server 1 together with meta information such as a location of imaging, a time of imaging, a direction of imaging, and a camera angle.

The image server 1 stores the uploaded captured image data in the image database 11 in association with the meta information. In addition to these pieces of information, other information, such as the names of specific architectures, such as "Tokyo Tower", "Kaminarimon", "Horyuji Temple", may be registered in association with images including images of these architectures as contents thereof.

Of what has been described above, FIG. 2 shows a scheme of operation mainly regarding user's operations of a client apparatus in a case where imaging-time information included in search-condition information specifies a past time.

More specifically, when a user wishes to obtain an image of an object in a certain direction captured in the past at a certain location, the user visits the location. Then, using the client apparatus 2, a digital camera 21 in this case, the user inputs information representing the past time, and sets the digital camera 21 and presses a shutter button in a desired imaging direction and at a desired camera angle.

At this time, the digital camera 21 is connected to the image server 1 via the communication network 3. In response to the shutter operation, the search request described earlier is transmitted from the client apparatus 2, i.e., the digital camera 21, to the image server 1, and a past image or past images detected by the searching are transmitted from the image server 1 to the digital camera 21. The past image or images transmitted from the image server 1 are displayed as a result of the searching on a display screen of an LCD of the digital camera 21.

Figure 2:
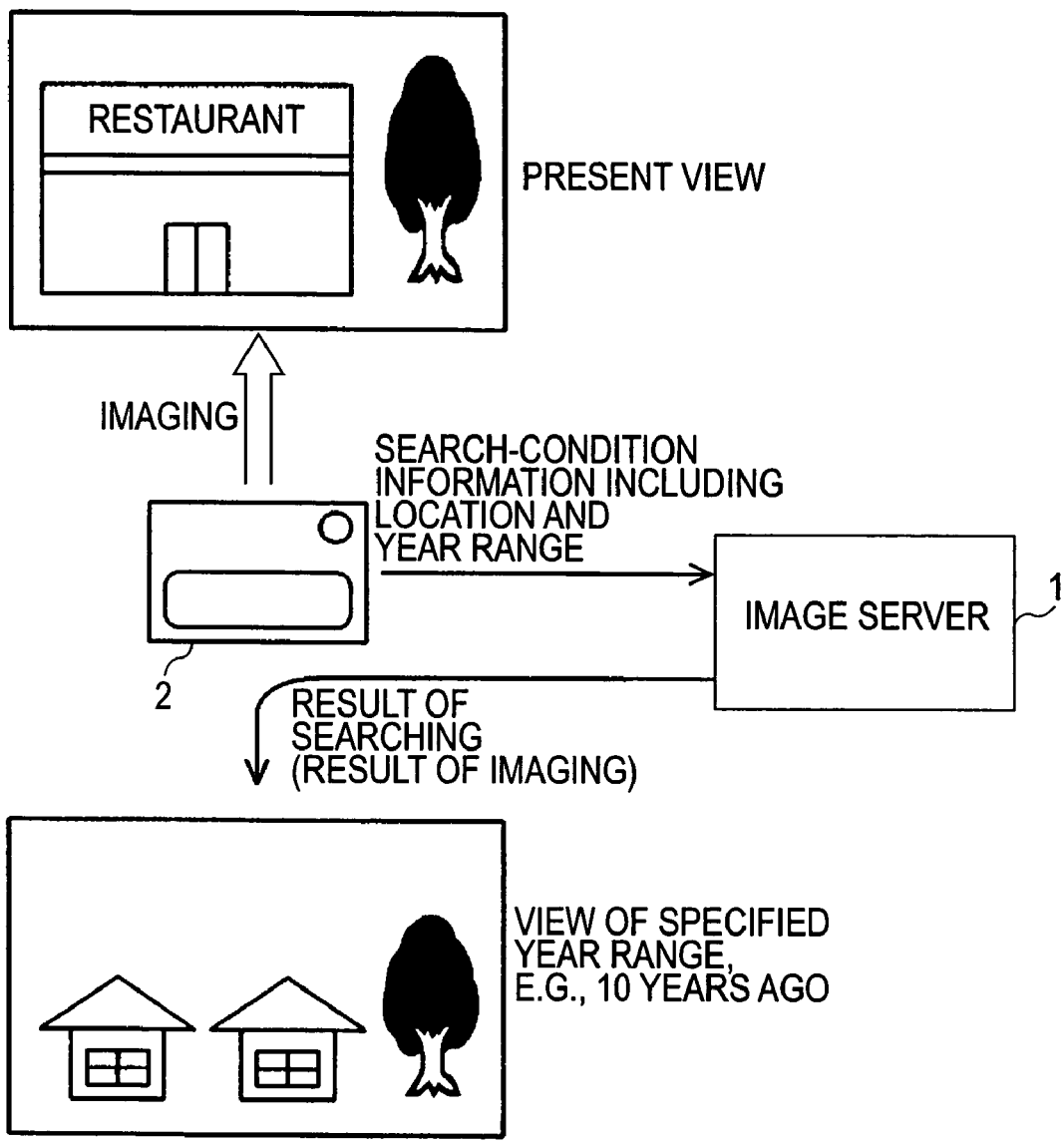
FIG. 2 is a diagram for explaining an example of imaging in the time-shift image distribution system according to the embodiment.

More specifically, the user inputs information representing a pat time, and sets the digital camera 21 in a desired direction to obtain a past image, thereby displaying a present view on a view finder implemented by an LCD as shown in an upper part of FIG. 2, and checks the imaging direction and camera angle. When the user presses the shutter button in this state, a past image provided from the image server 1 is displayed on the LCD screen of the digital camera 21 as if a past image were captured, as shown in a lower part of FIG. 2.

In what has been described above, when the shutter button is pressed, a search request is sent to the image server 1 and data of a past image relevant to the search request is transmitted from the image server 1 to the digital camera 21.

In this embodiment described below in detail, referring to FIG. 2, when the user inputs information representing a desired time to request and sets the digital camera 21 in a desired imaging direction and at a desired camera angle, a communication path is established between the image server 1 and the client apparatus 2, i.e., the digital camera 21, and a search request is transmitted from the digital camera 21 to the image server 1.

The image server 1 returns a search result at least including information representing the presence or absence of image data captured at the specified past time and matching the search condition such as the imaging direction and the camera angle. In this embodiment, in addition to the presence or absence of such image data, when the past time specified has a certain range, for example, when a year range is specified, information representing an approximate time of the relevant captured image in the year range is also transmitted. When a plurality of relevant captured images exists, times at which the individual images were captured are displayed on the digital camera 21 as will be described later.

Then, the user checks the past image returned in response to the search request. When a plurality of images is returned, the user selects whether to receive all the images or receive a specific captured image, and so forth, and then presses a shutter button. The operation of the shutter button in this case corresponds to a request for obtaining a captured image corresponding to the search result selected.

In response to the captured-image obtaining request transmitted from the client apparatus 2, i.e., the digital camera 21, the digital camera 21 downloads the past image relevant to the obtaining request from the image server 1.

As described earlier, the digital camera 21 displays the captured image received on the display screen of the LCD and records the captured image on a recording medium. When a plurality of images is requested and obtained, thumbnail images corresponding to the individual captured images may be displayed simultaneously on the LCD screen, or may be displayed by switching according to user's page shifting operations.

Example Hardware Configuration of Image Server

FIG. 1 shows an example hardware configuration of the image server 1 implemented using a computer.

Figure 3:
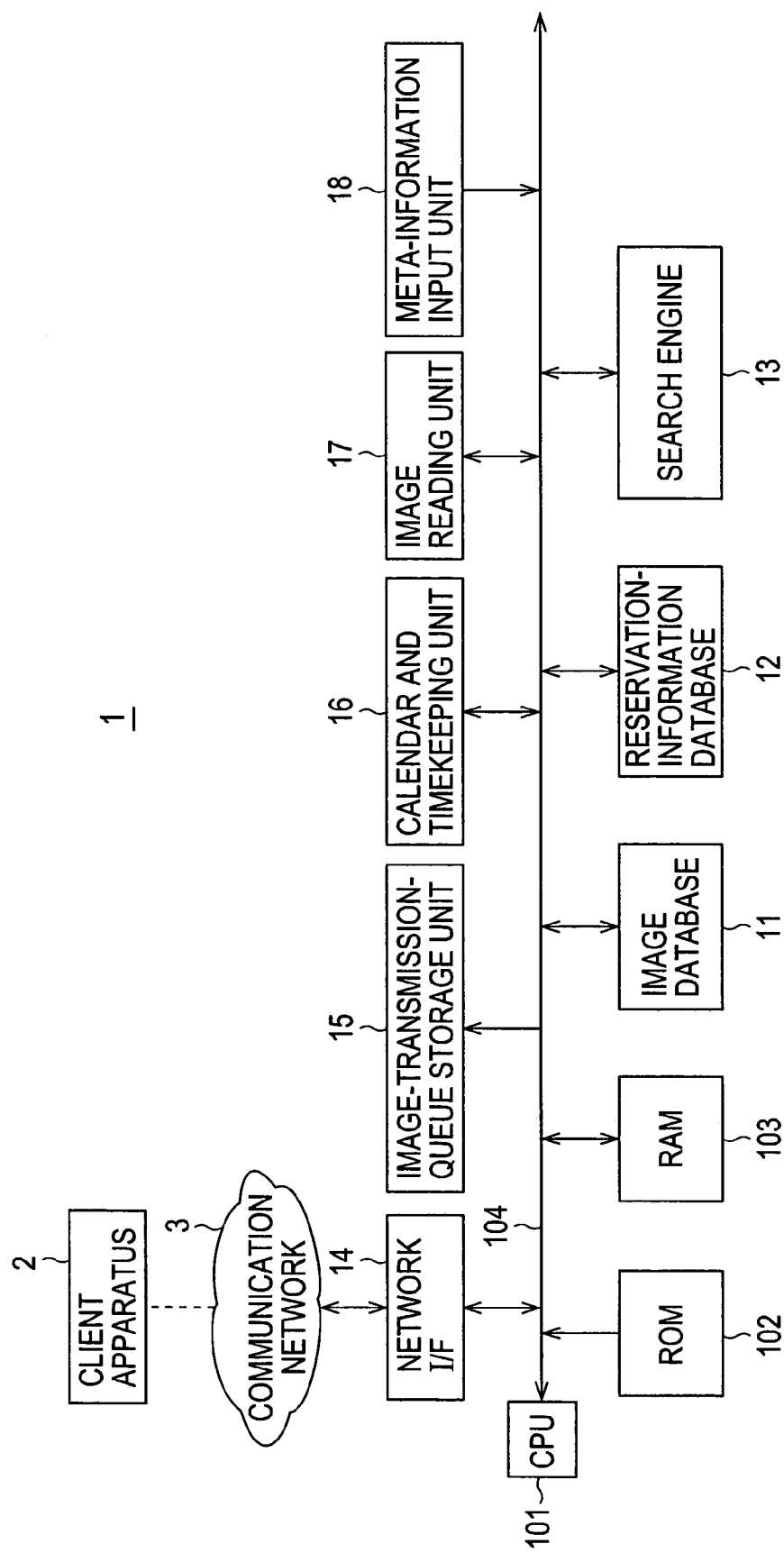
FIG. 3 is a block diagram showing an example configuration of an image server in the time-shift image distribution system according to the embodiment.

Referring to FIG. 3, a central processing unit (CPU) 101 is connected to a read-only memory (ROM) 102 and a random access memory (RAM) 103. Furthermore, an image database 11, a reservation-information database 12, a search engine 13, a network interface 14, an image-transmission-queue storage unit 15, a calendar and timekeeping unit 16, an image reading unit 17, and a meta-information input unit 18 are connected to a system bus 104.

As described earlier with reference to FIG. 1, in the image database 11, captured image data (image data content) is stored in association with meta information, such as information representing a time of imaging (year, month, day, hour, minute, and second), information representing a location of imaging, information representing a direction of imaging, and information representing a camera angle. In this embodiment, for example, captured image data is compressed into a predetermined storage format according to a predetermined compression scheme, and the compressed image data is stored in the image database 11. The association between captured image data and meta information is based on image identification information (hereinafter referred to as image IDs), such as identification numbers, assigned individually to captured images.

The image server 1 receives captured image data and meta information uploaded from the client apparatus 2 via the communication network 3 through the network interface 14, and stores the captured image data and meta information in the image database 11. Thus, in the image database 11, images captured by various users in various locations, in various imaging angles, and at various camera angles are constantly added and accumulated.

The captured image data and meta information stored in the image database 11 are not limited to those uploaded from the client apparatus 2 via the communication network 3.

For example, when a user brings in a sheet on which a captured image is printed and a memo of meta information of the captured image, or when an administrator of the image server 1 collected a sheet on which a captured image is printed and meta information of the captured image, the captured image printed on the sheet is converted into captured image data, and the meta information is input manually. Then, the captured image data yielded by the conversion is stored in the image database 11 in association with the meta information input.

In this embodiment, meta information stored in the image database 11 includes information representing a user who provided the image, such as a user ID, a camera ID, a client ID, an address, a name, and an age, in association with each piece of image identification information (image ID).

The image reading unit 17 includes a scanner for reading the captured image printed on the sheet, and converting the captured image into captured image data. The meta information input unit 18 includes an input operation unit for allowing manual input of meta information by an operator or the like.

When an administrator or user of the image server 1 captures an image by a digital camera or a camera-equipped cellular phone terminal and records the image on a recording medium, if captured image data is read directly from the recording medium without using the communication network 3, and when meta information is recorded together, the meta information is also read, and the captured image data and the meta information are stored in the image database 11 in association with each other. The image reading unit 17 includes a unit for reading captured image data and meta information from the recording medium.

When meta information is not recorded on the recording medium, or when meta information is to be added to meta information already recorded, meta information is manually input by an operator or the like using the input operation unit of the meta-information input unit 18 so that the meta information is stored in the image database 11.

In the reservation information database 12, when search-condition information included in a search request transmitted from a client apparatus includes imaging-time information specifying a future time, the search request is stored as a search reservation request. At this time, the search reservation request is stored in association with identification information of the client apparatus that issued the search request. Similarly to the case of a search request with imaging-time information specifying a past time, the search request includes a location of imaging, a time of imaging (future time), a direction of imaging, a camera angle, and so forth as search-condition information.

In this embodiment, a globally unique identifier (GUID), which allows globally unique identification, is used as the identification information of the client apparatus 2. The GUID is used to record the client apparatus 2 that has issued the search reservation request for a future captured image and to provide an image in accordance with the search reservation request at the specified future time to the client apparatus 2 having the GUID.

The search engine 13 searches information matching the search-condition information included in the search request transmitted from the client apparatus 2 from meta information stored in the image database 11. When matching meta information is detected, the search engine 13 determines that the associated captured image data is captured image data that serves as a result of the searching.

The image-transmission-queue storage unit 15 is used to execute the search reservation request including search-condition information specifying a future time as the time of imaging at the future time, and to reliably send the captured image obtained as a result of the searching to the client apparatus 2 at the source of the search reservation request.

More specifically, when the search reservation request is executed at the specified future time and a captured image is obtained as a result of the searching, and when the captured image data is sent to the client apparatus 2 at the source of the search reservation request, the client apparatus 2 may happen to be powered off so that it is not possible to establish a communication path with the image server 1 via the communication network 3. In consideration of such a situation, image data obtained as a result of searching in response to the search reservation request is stored in the image-transmission-queue storage unit 15. Then, at a suitable later time, image data obtained as s result of searching in response to the search reservation request is sent to the client apparatus 2 at the source of the search reservation request in order of storage in the image-transmission-queue storage unit 15.

The calendar and timekeeping unit 16 generates calendar and timekeeping information represented by year, month, day, hour, minute, and second. The calendar and timekeeping information is used to determine when searching is to be executed in accordance with a search reservation request transmitted from the client apparatus 2.

The ROM 102 stores a software program for receiving a search request transmitted from the client apparatus 2, causing the search engine 13 to execute searching, accumulating search reservation requests in the reservation-information database 12, and sending captured image data relevant to obtaining requests transmitted from the client apparatus 2 to the client apparatus 2 at the source of the obtaining requests. The CPU 101 executes processing according to the software program using the RAM 103 as a work area.

Functions and Operations of the Image Server 1

Figure 4:
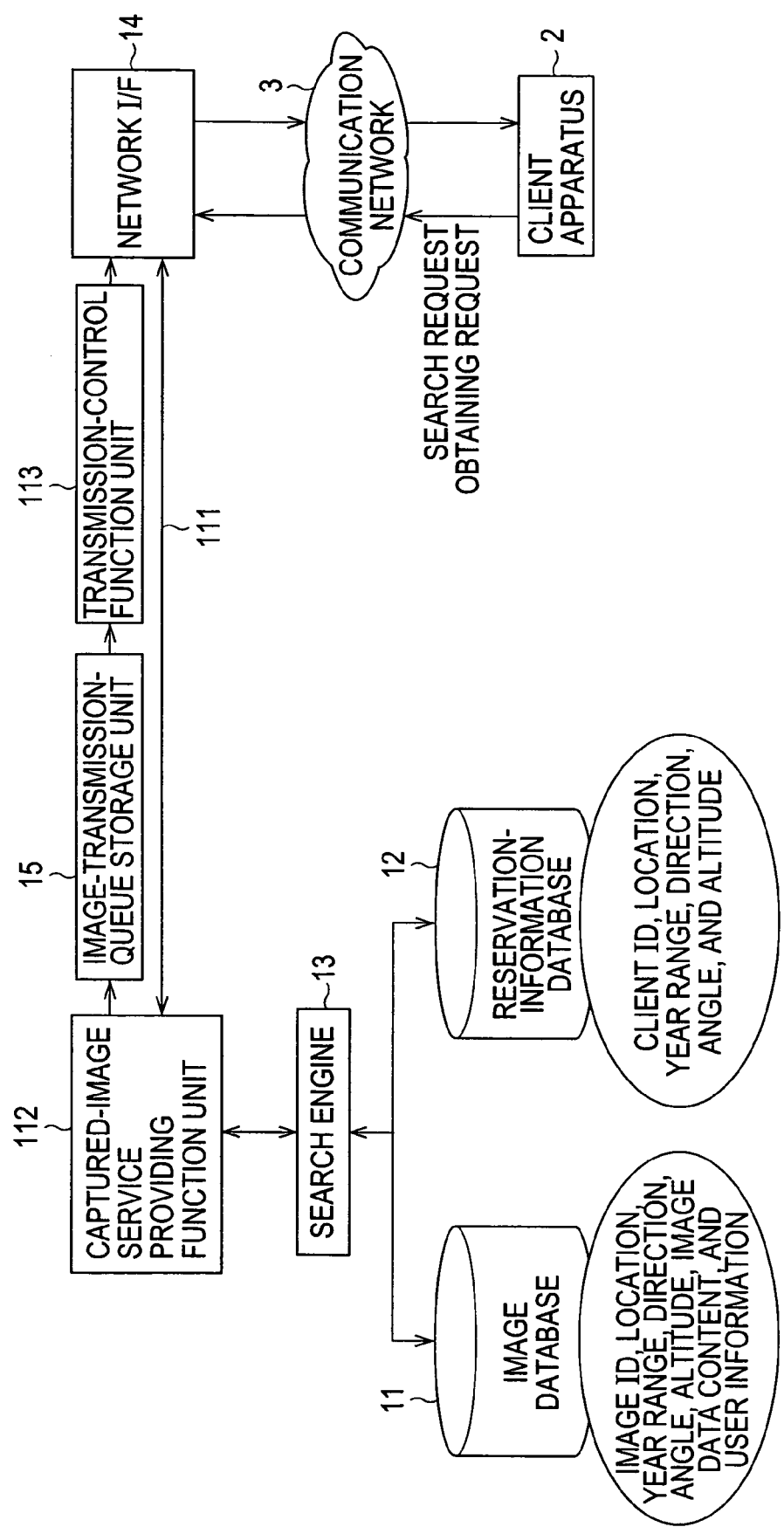
FIG. 4 is functional block diagram for explaining processing functions of the image server in the time-shift image distribution system according to the embodiment.

FIG. 4 mainly shows functions of the image server 1 having the hardware configuration described above.

Referring to FIG. 4, a search request is transmitted from the client apparatus 2 to the image server 1 via the communication network 3. The image server 1 receives the search request via the network interface 104, and transfers the search request to a captured-image service providing function unit 112 virtually through a path 111. The captured-image service providing function unit 112 is a function executed by the CPU 101 according to the software program stored in the ROM 102.

The captured-image service providing function unit 112 extracts imaging-time information in search-condition information included in a search request received, and checks whether the imaging time information specifies a past time or a future time.

When the imaging-time information specifies a past time, the captured-image service providing function unit 112 passes the search-condition information to the search engine 13 so that the search engine 13 is activated to search the image database 11 for a captured image matching the search-condition information.

When a captured image matching the search-condition information is detected by the searching, the search engine 13 passes at least identification information (image ID) and imaging-time information of the captured image detected by the searching to the captured-image service providing function unit 112.

The captured-image service providing function unit 112 forwards the identification information (image ID) and the imaging-time information received as a result of the searching onto the communication network 3 through the path 111 and via the network interface 14 so that the identification information and the imaging-time information are transmitted to the client apparatus 2 at the source of the search request.

After receiving the identification information and the imaging-time information, when an operation for requesting obtainment of the captured image detected by the searching is performed (e.g., the shutter button is pressed) at the client apparatus 2, a request for obtaining the captured image detected by the searching is transmitted to the image server 1 via the communication network 3. The obtaining request includes identification information of the captured image received by the client apparatus 2 as a result of the searching.

In the image server 1, the captured-image service providing function unit 112 receives the obtaining request via the network interface 14, reads image data corresponding to the image ID included in the obtaining request from the image database 11 via the search engine 13, and sends the image data to the client apparatus 2 via the network interface 14 and the communication network 3.

When the search-condition information included in the search request received specifies a future time as the time of imaging, the captured-image service providing function unit 112 of the image server 1 regards the search request as a search reservation request, and registers the search request in the reservation-information database 12.

The information registered in the reservation-information database 12 at this time includes identification information of the client apparatus 2, i.e., the GUID in this example, an address (e.g., a uniform resource locator (URL)) on the communication network 3 for providing captured image data via the communication network 3, and search-condition information such as imaging-time information representing a future time, a location of imaging, a direction of imaging, and a camera angle.

The image detected in response to the search reservation request may be provided, for example, in the form of a printed image by mail, instead of providing the image via the communication network 3. In consideration of this situation, it is desired to register an address, a mail address, and other information of the user of the client apparatus 2 in the reservation-information database 12.

At a timing when, for example, image data and meta information of a new captured image are additionally registered in the image database 11, the captured-image service providing function unit 112 checks whether a search reservation request that is to be processed at the timing exists. When such a search reservation request exists, the captured-image service providing function unit 112 executes a routine for handling the search reservation request.

When a captured image matching the search-condition information is detected by the routine for handling the search reservation request, the captured-image service providing function unit 112 reads the address of the client apparatus 2 that issued the search reservation request, stored in the reservation-information database 12, and registers a job in the image-transmission-queue storage unit 15 to access the address and send data of the captured image detected by the searching.

A transmission-control function unit 113 is implemented by a software program stored in the ROM 102. The transmission-control function unit 113 checks the content of the image-transmission-queue storage unit 15, for example, at a predetermined interval, to check whether image data to send has been queued. When it is determined that image data to transmit has been queued, the transmission control program transmits images in order of storage in the image-transmission-queue storage unit 15. The transmission-control function unit 113 sends all image data that is stored in the image-transmission-queue storage unit 15 and yet to be transmitted while deleting image data that has been transmitted from the image-transmission-queue storage unit 15.

Example Hardware Configuration of the Client Apparatus (Time-Shift Image Requesting Apparatus)

Figure 5:
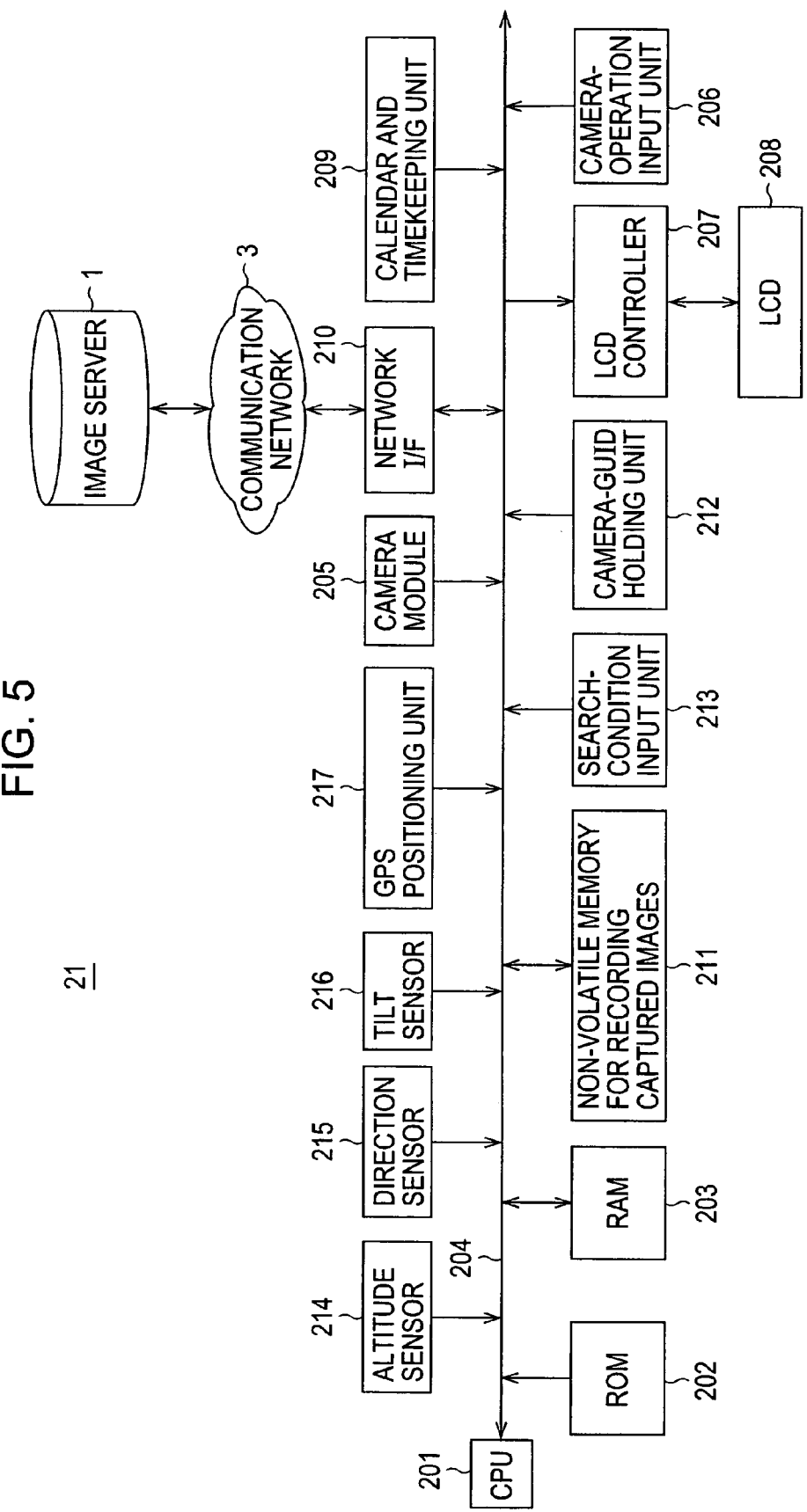
FIG. 5 is a block diagram showing an example configuration of a digital camera as an example of a client apparatus in the time-shift image distribution system according to the embodiment.

FIG. 5 shows an example hardware configuration of the client apparatus 2. The client apparatus 2 is an imaging device capable of carrying out wireless communications, i.e., a digital camera 21 in this example. Although this embodiment will be described in the context of a digital camera for capturing still images, the digital camera may also be capable of capturing moving images.

Referring to FIG. 5, in the digital camera 21 according to this embodiment, a CPU 201 is connected to a ROM 202 and a RAM 203 via a system bus 204, and the system bus 204 is connected to a camera module 205, a camera operation input unit 206, an LCD controller 207 for controlling display on an LCD 208, a calendar and timekeeping unit 209, and a network interface 210.

Furthermore, the system bus 204 is connected to a non-volatile memory 211 for recording captured images, a camera-GUID holding unit 212, a search-condition input unit 213, an altitude sensor 214, a direction sensor 215, a tilt sensor 216, and a GPS positioning unit 217.

In the ROM 202, in addition to a program for carrying out imaging, a program for issuing a search request and an obtaining request to the image server 1 and obtaining information transmitted in response to the search request and the obtaining request from the image server 1 and displaying and recording the information, a program for uploading captured image data to the image server 1, and so forth are stored. As will be described later, the CPU 201 executes these programs stored in the ROM 202 using the RAM 203 as a work area.

The camera module 205 includes an imaging device implemented by a charge coupled device (CCD) imager or a complementary metal oxide semiconductor (CMOS) imager, an imaging optical system including an imaging lens, and a captured-image-signal processor. The camera module 205 outputs captured image data in the form of digital signals to the system bus 204.

The camera-operation input unit 206 includes a set of keys that are used for imaging, such as a zoom key and a shutter button. The CPU 201 monitors which of these keys is operated in the camera-operation unit 206, and executes processing in accordance with the key operated according to programs stored in the ROM 202.

The LCD controller 207, under the control of the CPU 201 according to programs stored in the ROM 202, controls display on the display screen of the LCD 208 connected thereto.

The calendar and timekeeping unit 209 generates calendar and timekeeping information representing year, month, day, hour, minute, and second. The calendar and timekeeping information is stored at the time of imaging as imaging-time information. When a timer operation is performed, a timer period is measured on the basis of timekeeping information supplied from the calendar and timekeeping unit 209.

The network interface 210 allows exchanging information with the image server 1 via the communication network 3.

The non-volatile memory 211 for recording captured images is implemented, for example, by a flash memory, such as a card-shaped memory. Alternatively, the non-volatile memory 211 may be implemented by a recording medium such as a digital versatile disc (DVD). Instead of such a removable memory medium, the non-volatile memory 211 may be implemented by a hard disk.

The camera GUID holding unit 212 is a storage unit for holding a camera GUID that serves as globally unique camera identification information. As described earlier, when search-condition information includes imaging-time information specifying a future time, the camera GUID is used as identification information when the image server 1 remembers which digital camera (client apparatus) issued the search reservation request and when image data captured at the future time specified in the request is transmitted to the digital camera 21 at the source of the search reservation request.

Figure 6:
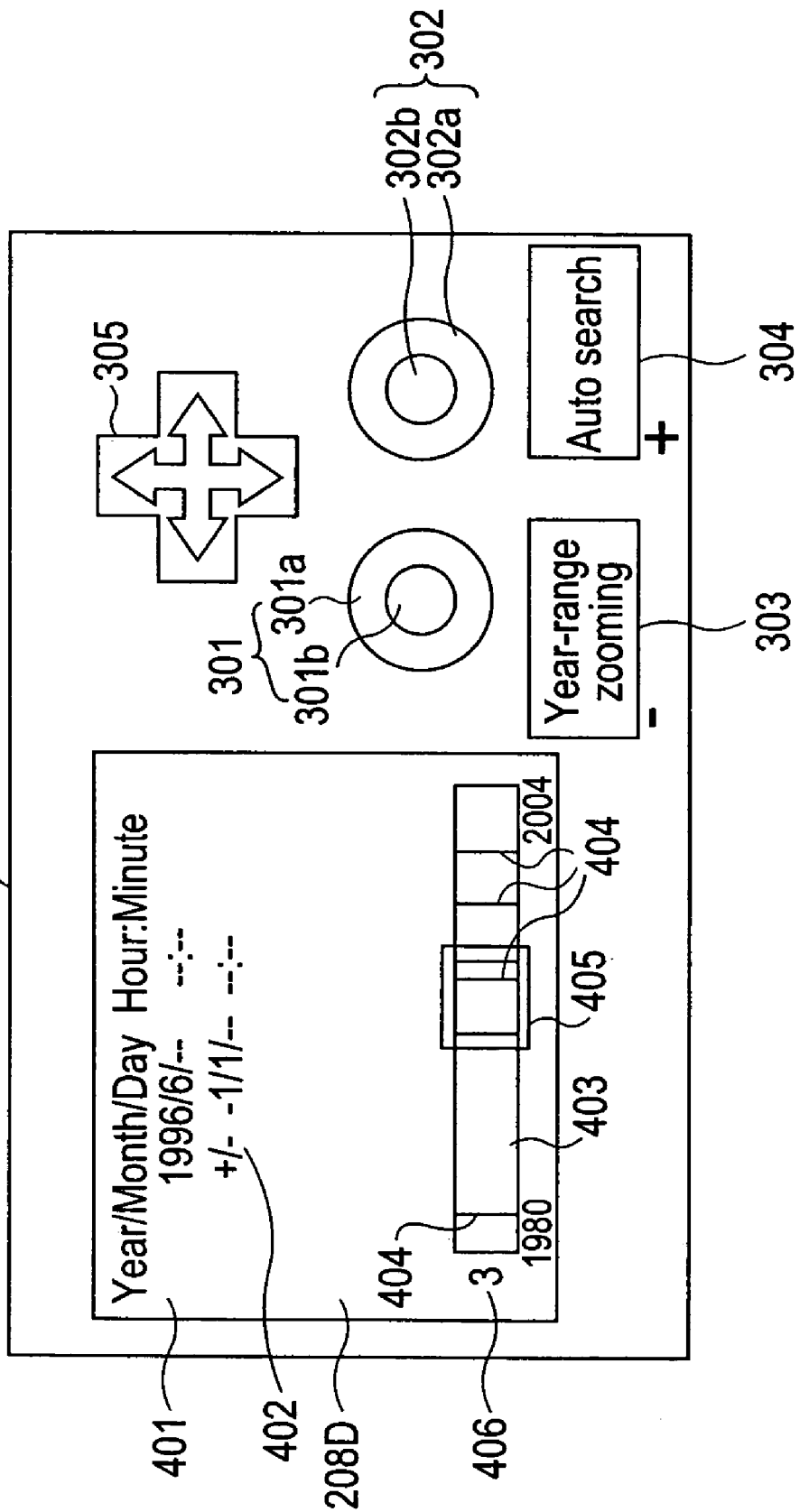
FIG. 6 is a diagram for explaining an operation unit of the digital camera as the example of the client apparatus in the time-shift image distribution system according to the embodiment.

The search-condition input unit 213 includes operation keys with which the user inputs search-condition information included in a search request for a past or future captured image, transmitted to the image server 1. FIG. 6 is a diagram showing an example of the search-condition input unit 213 included in the digital camera 21 according to this embodiment. FIG. 6 shows a back side of the case of the digital camera 21 opposite to a front side on which an imaging lens is provided. In this example, the keys of the search-condition input unit 213 are provided on a side of a screen 208D of the LCD 208 on the back side of the digital camera 21.

In this embodiment, for example, as shown in FIG. 6, the search-condition input unit 213 includes a date dial key 301 for inputting imaging-time information (year, month, day, and time) representing a time of imaging, a range specifying dial key 302 for specifying a range of searching with reference to the time specified by the date dial key 301, a year-range zooming key 303, an auto search key 304, and a cross-shaped cursor key 305.

In this example, the date dial key 301 has a donut-shaped part 301a and a central circular part 301b. When the donut-shaped part 301a is operated in the circumferential direction, the year, month, day, and time specified are changed forward or backward in accordance with the direction of operation. At this time, the year, month, day, and time specified using the date dial key 301 are displayed on the LCD screen 208D as specified date indication 401 as shown in FIG. 6. The user can fix the specified year, month, day, and time by pressing the central circular part 301b of the date dial key 301. That is, the central circular part 301b of the date dial key 301 serves as a specification fixing key.

Similarly, the range specifying dial key 302 has a donut-shaped part 302a and a central circular part 302b. When the donut-shaped part 302a is operated in the circumferential direction, the specified range of date and time increases or decreases in accordance with the direction of operation. At this time, the range of date and time specified using the range specifying dial key 302 is displayed as date range indication 402 on the LCD screen 208D as shown in FIG. 6.

The user can fix the specified range of date and time by pressing the central circular part 302b of the range specifying dial key 302. That is, the central circular part 302b of the range specifying dial key 302 serves as a range specification fixing key.

In the example shown in FIG. 6, with respect to the date and time represented by the specified date indication 401, the range of date and time specified by the date range indication 402 is used as imaging-time information included in search-condition information.

In this example, with respect to the date and time represented by the specified date and time indication 401, a range of preceding or succeeding period corresponding to the year, month, day, and time specified by the range specifying dial key 302 is used as imaging-time information included in search-condition information. Alternatively, with respect to the date and time represented by the specified date indication 401, a range of succeeding period corresponding to the year, month, day, and time specified using the range specifying dial key 302 or a range of preceding period corresponding to the year, month, day, and time specified using the range specifying dial key 302 may be used as imaging-time information included in search-condition information.

Yet alternatively, a range of years may be used as imaging-time information included in search-condition information. For example, a range specification such as the year 1998 or from the year 1998 to the year 2000 may be used as imaging-time information included in search-condition information.

In a lower part of the LCD screen 208D shown in FIG. 6, in this embodiment, a bar (hereinafter referred to as a navigation bar) 403 indicating how many years the captured images accumulated in the image server 1 date back to is displayed.

That is, in this embodiment, when the digital camera 21 sends a search request including imaging-time information to the image server 1, the image server 1 searches captured images matching search-condition information such as an imaging location and an imaging direction, not only within the range of imaging time specified as described above. When a plurality of captured images is detected by the searching, the image server 1 sends information representing imaging-time information and identification information of the individual captured images as search-result information.

Upon receiving the search-result information, the digital camera 21 indicates the existence of the individual captured images by vertical bar marks 404. That is, the navigation bar 403 represents, for example, a range of 20 to 30 years by a horizontal bar with respect to the date and time specified using the date dial key 301. In the example shown in FIG. 6, the navigation bar 403 represents a range from the year 1980 to the year 2004.

The range of years represented by the navigation bar 403 can be changed by operating the year-range zooming key 303. More specifically, in this embodiment, the year-range zooming key 303 is a seesaw key. That is, when the year-range zooming key 303 is operated in the "−" direction, although the length of the navigation bar 403 does not change, the range of years represented by the navigation bar 403 becomes narrower (with respect to the same specified date).

On the other hand, when the year-range zooming key 303 is operated in the "+" direction, although the length of the navigation bar 403 does not change, the range of years represented by the navigation bar 403 becomes wider (with respect to the same date specified).

In the navigation bar 403, vertical bar marks 404 are displayed at positions corresponding to the imaging times of the individual captured images included in the search-result information transmitted from the image server 1, thereby notifying the user that captured images matching search conditions except for imaging time exist at the positions of the vertical bar marks 404.

In this embodiment, the range of imaging time represented by the specified date indication 401 and the range indication 402 is presented to the user by specified range frame indication 405. That is, in the navigation bar 403, the date range enclosed in the frame of the specified range frame indication 405 is the range currently specified as search-condition information regarding the imaging time.

As shown in FIG. 6, in this embodiment, of the search-result information obtained from the image server 1, the number of captured images included in the specified range frame indication 405 is displayed as number-of-matching-image indication 406. In the example shown in FIG. 6, it is indicated that three images matching the search condition exists in the specified range frame indication 405. When no captured image matching the search condition exists in the image server 1, "0" or "None" is displayed as the number-of-matching-image indication 406.

When the LCD 208 is a color LCD, preferably, for example, vertical bar marks indicating existence of captured images matching search-condition information are displayed in red and the specified-range frame indication 405 is displayed in green so that the ease of visual recognition is improved. This serves to improve the ease of operation for the user.

In this embodiment, the position of the specified-range frame indication 405 can be moved leftward or rightward by operation of the cross-shaped cursor key 305, thereby changing imaging time and imaging time range included in search-condition information. That is, when the position of the specified-range frame indication 405 is moved leftward or rightward by operation of the cross-shaped cursor key 305, the indications 401 and 402 change in accordance with the position of the specified-range frame indication 405.

That is, in this embodiment, imaging time and imaging time range included in search-condition information may be specified by changing the position of the specified-range frame indication 405 on the navigation bar 403 using the cross-shaped cursor key 305 instead of direct specification using the date dial 301 and the range specifying dial key 302.

In this embodiment, when a past time is specified as imaging-time information included in search-condition information and the shutter button is pressed, the operation virtually achieves the effect of capturing an image at a past time in the frame of the specified-range frame indication 405.

In this embodiment, when the user inputs information representing a past time as imaging information included in search-condition information, or when a past time that has been input is changed, or when parameters in the search condition information such as an imaging location, an imaging direction, and an imaging angle are changed as will be described later, the imaging device automatically establishes a communication path with the image server 1 via the communication network 3 and sends a search request.

However, it is difficult to constantly maintain a communication path between the imaging device and the image server 1. Thus, it is desired that the user be allowed to connect to the image server 1 and to send a search request when the user so desires. The auto search key 304 is provided for this purpose.

Alternatively, it is possible to access the image server 1, send a search request, receive search-result information from the image server 1, and display the navigation bar 403 only when the user operates the auto search key 304.

The altitude sensor 214 detects the altitude of the current location of the digital camera 21, and sends information representing the altitude detected onto the system bus 204.

The direction sensor 215 detects the direction of an optical axis of the lens optical system of the camera module 205, i.e., the direction of imaging, and sends information representing the imaging direction detected onto the system bus 204.

The tilt sensor 216 detects the angle of the direction of the optical axis of the lens optical system of the camera module 205 with respect to a horizontal plane (an angle of elevation or depression), i.e., an upward or downward angle of the imaging direction of the digital camera 21 (what is referred to as an imaging angle), and sends information representing the imaging angle detected onto the system bus 204.

The GPS positioning unit 217 receives electromagnetic waves transmitted from GPS satellites to detect a current location of the digital camera 21, and sends information representing the current location detected onto the system bus 204.

In this embodiment, as will be described later, the altitude information from the altitude sensor 214, the imaging-direction information from the direction sensor 215, the imaging-angle information from the tilt sensor 216, and the location information from the GPS positioning unit 217 are recorded in the non-volatile memory 211 as meta information of the relevant captured image.

When a search request is sent to the image server 1, in addition to the imaging-time information described earlier, the altitude information from the altitude sensor 214, the imaging-direction information from the direction sensor 215, the imaging-angle information from the tilt sensor 216, and the location information from the GPS positioning unit 217 are included in search-condition information.

Furthermore, in this embodiment, the user is allowed to determine whether or not to upload an image captured by the digital camera 21 to the image server 1, and information representing the setting is stored in a non-volatile memory (not shown), which may be a memory backed up by a battery. When the shutter button is pressed, the setting information is checked, and the captured image is uploaded to the image server 1 together with meta information to the image server 1 when uploading is permitted.

Instead of holding setting predefined by the user as to whether to permit uploading to the image server 1, each time the user presses the shutter button, a message may be displayed on the LCD screen 208D to ask the user whether to permit uploading of data of the captured image to the image server 1, prompting the user to choose whether to permit uploading.

As described above, in the digital camera 21 according to this embodiment, the location and angle of imaging by the user are recognized by the altitude sensor 214, the direction sensor 215, the tilt sensor 216, and the GPS positioning unit 217 mounted on the digital camera 21. The digital camera 21 issues a search request to the image server 1 using the conditions recognized and a non-present imaging time such as a past or future year as search conditions, thereby searching the image server 1 on the Internet for past images captured in the year and matching the search conditions.

When the user presses the shutter button, an image of the specified year range is transmitted from the image server 1. This is as if an image of the past or the future were taken.

As for a future image, a reservation is registered in the image server 1, so that an image captured at a date and time specified in the reservation will be transmitted to the digital camera 21.

Thus, a virtual time-machine camera that allows not only capturing a present view but also allows imaging beyond restriction of time can be implemented.

Example Procedure for Obtaining Past Image

Now, a procedure for obtain a past image using the digital camera 21 configured as described above will be described, including relationship with the image server 1.

An image shown in an upper part of FIG. 2 is an image that is displayed when the user uses the LCD screen 208D as a viewfinder. In this state, the user can specify a desired year, month, and day of imaging by operating the date dial key 301 of the digital camera 21.

When the digital camera 21 is in an imaging mode, the altitude sensor 214, the direction sensor 215, the tilt sensor 216, and the GPS positioning unit 217 constantly obtain data. The digital camera 21 issues a search request to the image server 1 as to whether an image matching search-condition information, such as a specified date and a current location and imaging direction of the digital camera 21, exists.

On the basis of a search result returned from the image server 1, the navigation bar 403 is displayed on the LCD screen 208D, and the number of captured images existing at the image server 1 and matching the specified date and time range is displayed.

When the user checks the result of searching by the image server 1 through the navigation bar 403 and presses the shutter button, images falling in the specified year range are transmitted from the image server 1. This is as if images of the past were taken.

For example, referring to FIG. 2, assuming that the current year is 2005, when the year-range setting for captured images to request via the digital camera 21 is 10 years before, i.e., 1995, and the digital camera 21 is set at such an angle that the image shown in the upper part of FIG. 2 is covered, it is indicated on the LCD screen 208D that one corresponding image exists at the image server 1. When the shutter button is pressed in this state, an image of the year 1995, shown in a lower part of FIG. 2, is obtained.

At the same time, an image of the present view, shown in the upper part of FIG. 2, is also captured. When the setting of the digital camera 21 permits uploading, the image of the present view is uploaded to the image server 1 as data of a new captured image.

Example Procedure for Obtaining Future Image

When the user specifies a future time as an imaging time in search-condition information, i.e., when a future year range is specified, no corresponding captured image exists at the time when the shutter button of the digital camera 21 is pressed, so that it is not possible to obtain an image immediately. Since a future image does not currently exist, a reservation for the image providing service of the image server 1 is made. When the specified date and time has come, if an image matching the search condition exists, the image is transmitted from the image server 1 to the digital camera 21 that has made the reservation or to another terminal specified by the user.

Since it is often the case that no image corresponding to a future image exists when a range up to a specific date is specified, it is allowed to set a range on and after a specific date or to set a considerably broad range.

Also when the shutter button is pressed with a future time specified, when the setting of the digital camera 21 permits uploading, the digital camera 21 captures an image of the present view and uploads the image with meta information to the image server 1.

Flowcharts of Operations of Digital Camera (Time-Shit Image Requesting Apparatus)

Next, operations of the digital camera 21 for issuing a search request and for issuing an obtaining request to the image server 1 and routines for handling these requests will be described with reference to flowcharts shown in FIGS. 7 to 9.

In step S101, when the user issues an instruction for entering the imaging mode, the CPU 201 of the digital camera 21 first checks whether to enter a time-shift imaging mode for capturing an image of a past time or a future time, not a present time. Whether to enter the time-shift imaging mode is determined on the basis of, for example, whether a non-present time is specified by the date dial key 301. Alternatively, a key for specifying either a time-shift imaging mode or an ordinary imaging mode may be provided so that whether to enter the time-shift imaging mode can be determined on the basis of a user's operation of the key.

When it is determined in step S101 not to enter the time-shift imaging mode, in step S102, the CPU 201 executes a processing routine of enters the ordinary imaging mode and executes a processing routine of the ordinary imaging mode.

In the ordinary imaging mode, the CPU 201 displays an image of an object on the LCD screen 208D using the LCD screen 208D as an electronic viewfinder. When the user presses the shutter button, the CPU 201 executes processing for actually capturing an image of the object and storing captured image data in the non-volatile memory 211 for recording captured images. At this time, when the digital camera 21 is in the imaging mode, the altitude sensor 214, the direction sensor 215, the tilt sensor 216, and the GPS positioning unit 217 constantly obtain data. The altitude data, the imaging-direction data, the camera-angle data, the imaging-location data, and the current date and time obtained from the calendar and timekeeping unit 209 are stored in the non-volatile memory 211 for recording captured images, in association (on the basis of the image ID) with the captured image data as meta information of the captured image.

At this time, when the setting of the digital camera 21 permits uploading to the image server 1, the digital camera 21 uploads the captured image of the present view and meta information to the image server 1 via the communication network 3.

When it is determined in step S101 to enter the time-shift imaging mode, the CPU 201 obtains information representing a current location from the GPS positioning unit 217 in step S103, obtains information representing a current altitude from the altitude sensor 214 in step S104, obtains information representing an imaging direction from the direction sensor 215 in step S105, and obtains camera tilt-angle information from the tilt sensor 216 in step S106.

Furthermore, in step S107, the CPU 201 obtains imaging-time information specified by the user using the date dial key 301, the cross-shaped cursor key 305, or the like. Also, in step S108, the CPU 201 obtains information representing a search range regarding the imaging time, set by the user using the range specifying dial key 302 or the like.

Then, in step S109, the CPU 201 checks whether the pieces of information obtained from the sensors 214 to 216 and the GPS positioning unit 217 or the specification of imaging time or range has been changed. When it is determined in step S109 that the pieces of information obtained from the sensors 214 to 216 and the GPS positioning unit 217 or the specification of imaging time or range has not been changed, in step S110, the CPU 201 checks whether a predetermined time has elapsed.

When it is determined in step S110 that the predetermined time has elapsed, returning to step S103, the CPU 201 obtains information such as sensor values and an imaging time.

Figure 8:
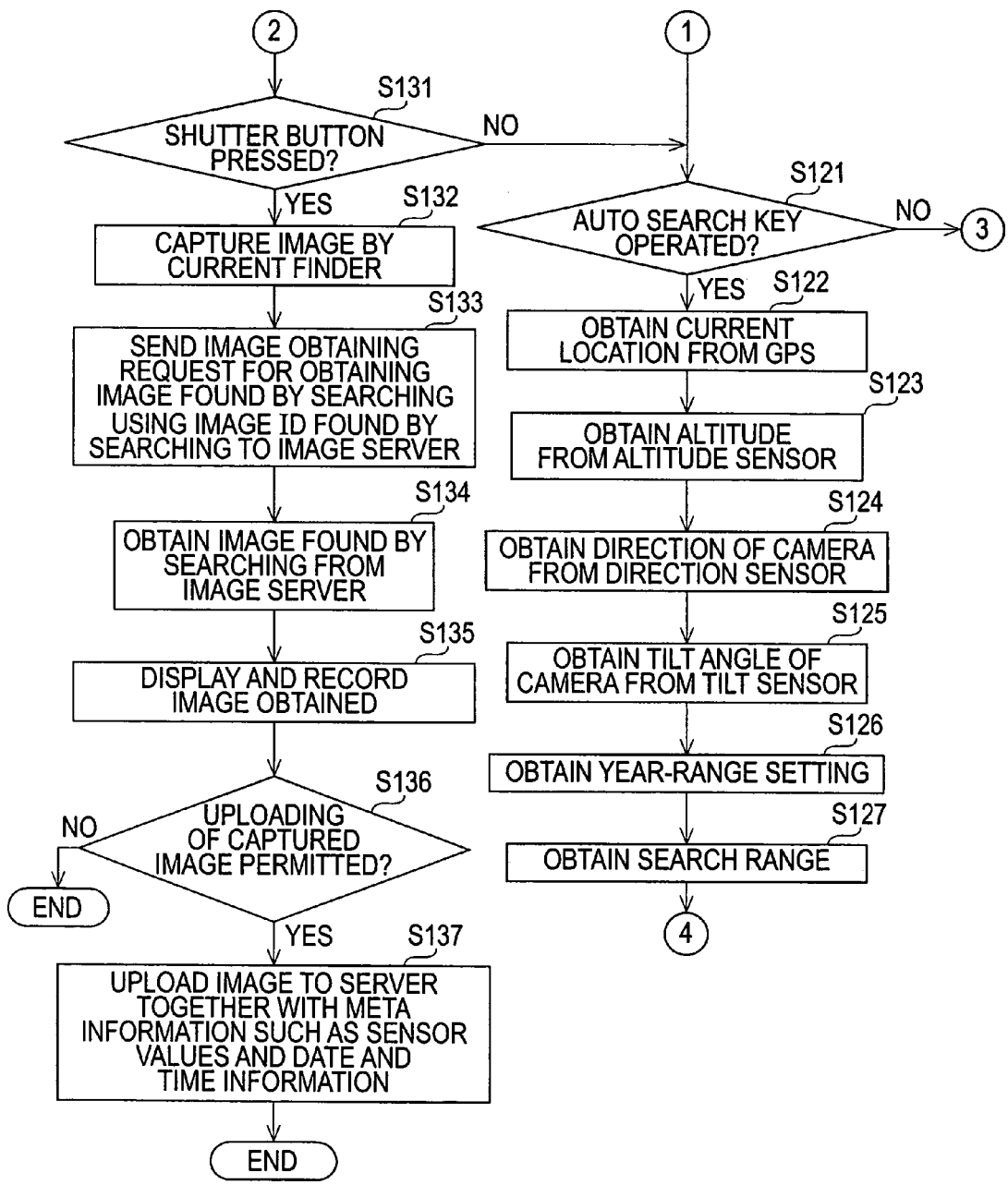
FIG. 8 is a part of the flowchart for explaining the processing operation executed by the digital camera as the example of the client apparatus in the time-shift image distribution system according to the embodiment.

When it is determined in step S110 that the predetermined time has not elapsed, in step S121 shown in FIG. 8, the CPU 201 checks whether the auto search key 304 has been operated by the user. When it is determined that the auto search key 304 has not been operated, returning to step S110, the CPU 201 monitors elapse of the predetermined time.

When it is determined that the auto search key 304 has been operated, the CPU 201 obtains information representing a current location from the GPS positioning unit 217 in step S122, obtains information representing a current altitude from the altitude sensor 214 in step S123, obtains information representing an imaging direction from the direction sensor 215 in step S214, and obtains information representing a camera tilt angle of the digital camera 21 from the tilt sensor 216 in step S125.

Furthermore, in step S126, the CPU 201 obtains information representing an imaging time specified by the user using the date dial key 301, the cross-shaped cursor key 305, or the like. Also, in step S127, the CPU 201 obtains an imaging-time search range specified by the user using the range specifying dial key 302 or the like.

Figure 7:
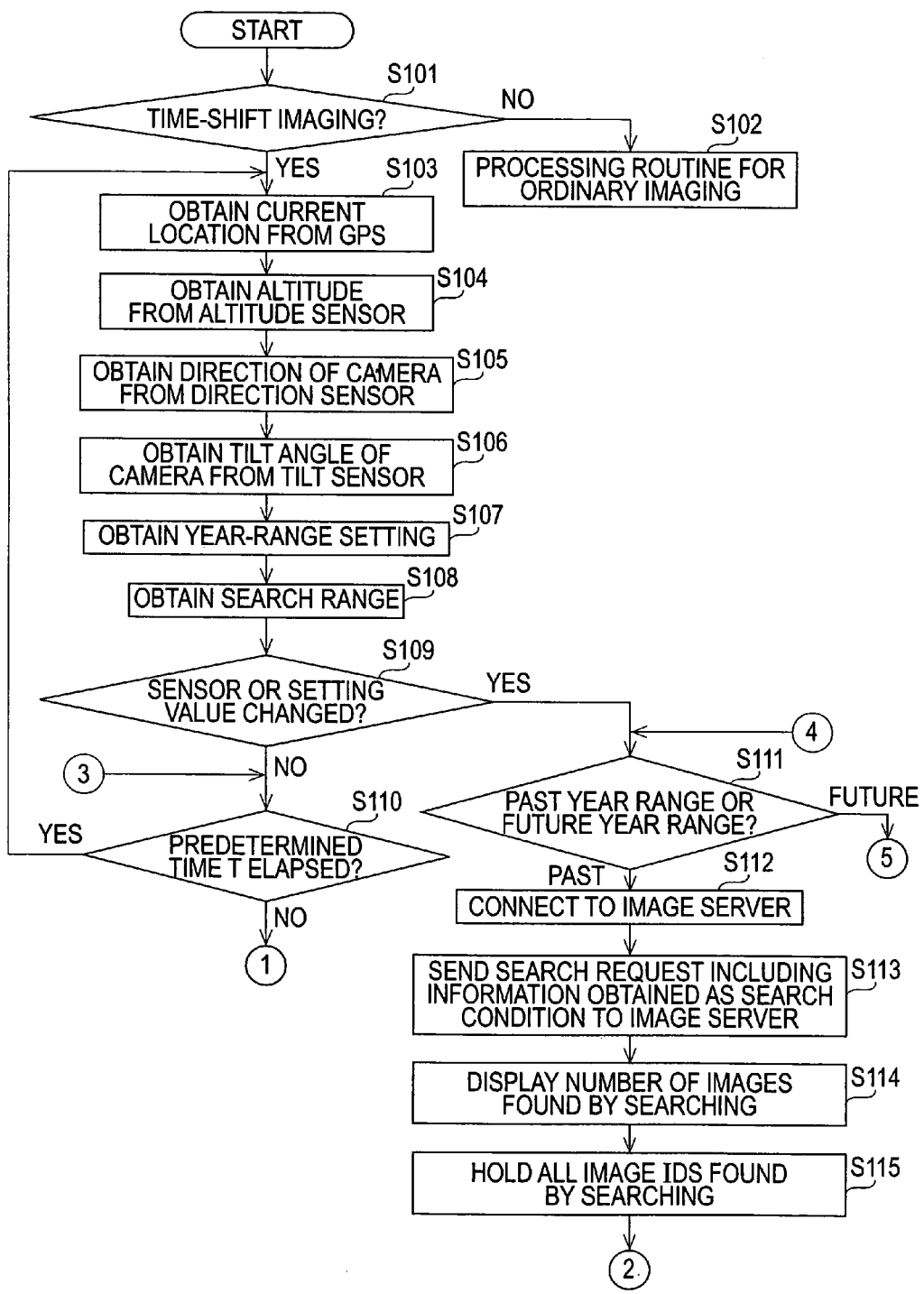
FIG. 7 is a part of a flowchart for explaining a processing operation executed by the digital camera as the example of the client apparatus in the time-shift image distribution system according to the embodiment.

After step S127, the procedure proceeds to step S111 shown in FIG. 7. The procedure also proceeds to step S111 when it is determined in step S109 that the pieces of information obtained from the sensors 214 to 216 or the specification of imaging time or range has been changed.

In step S111, the CPU 201 determines whether the imaging time specified by the user is a past time or a future time. When it is determined in step S111 that the imaging time specified by the user is a past time, in step S112, the CPU 201 accesses the image server 1 via the network interface 210 and the communication network 3 to establish a communication path with the image server 1. In this embodiment, an address of the image server 1 on the communication network 3 is stored in advance in the digital camera 21, and the address information is used to access the image server 1 automatically.

When a communication path with the image server 1 is established as described above, in step S113, the CPU 201 sends a search request to the image server 1, the search request including the pieces of information obtained from the sensors 214 to 216 and the GPS positioning unit 217 and the specification of imaging time and range as search-condition information.

In response to the search request, search-result information is returned from the image server 1 as described earlier. Upon receiving the search-result information, in step S114, the CPU 201 displays the navigation bar 403, and displays the number of captured images matching the search-condition information on the LCD screen 208D. In step S115, the CPU 201 stores the image IDs of all the captured images matching the search-condition information, transmitted from the image server 1.

Then, in step S131 shown in FIG. 8, the CPU 201 checks whether the shutter button has been pressed. When it is determined that the shutter button has not been pressed, proceeding to step S121, the CPU 201 executes subsequent steps described earlier.

On the other hand, when it is determined in step S131 that the shutter button has been pressed, in this embodiment, in step S132, the CPU 201 captures an image of the present view displayed on the LCD screen 208D to obtain image data, also obtains meta information described earlier, and writes the image data and the meta information to the non-volatile memory 211 for recording captured images.

In step S133, the CPU 201 sends an image obtaining request for obtaining captured images matching the search-condition information to the image server 1, the image obtaining request including the image IDs stored in step S115.

In response to the image obtaining request, image data of captured images identified by the image IDs is transmitted from the image server 1. The CPU 201 receives the image data in step S134, and displays the images on the LCD screen 208D and writes the image data to the non-volatile memory 211 for recording captured images in step S135.

In step S136, the CPU 201 checks whether the setting permits uploading of captured images. When it is determined that the setting permits uploading, in step S137, the CPU 302 sends an image uploading request to the image server 1, and sends image data and meta information of the captured image of the present view recorded in step S132 to the image server 1. The CPU 201 then exits the processing routine.

When it is determined in step S136 that the setting does not permit uploading of captured images, the CPU 201 skips step S137 and immediately exists the processing routine.

Figure 9:
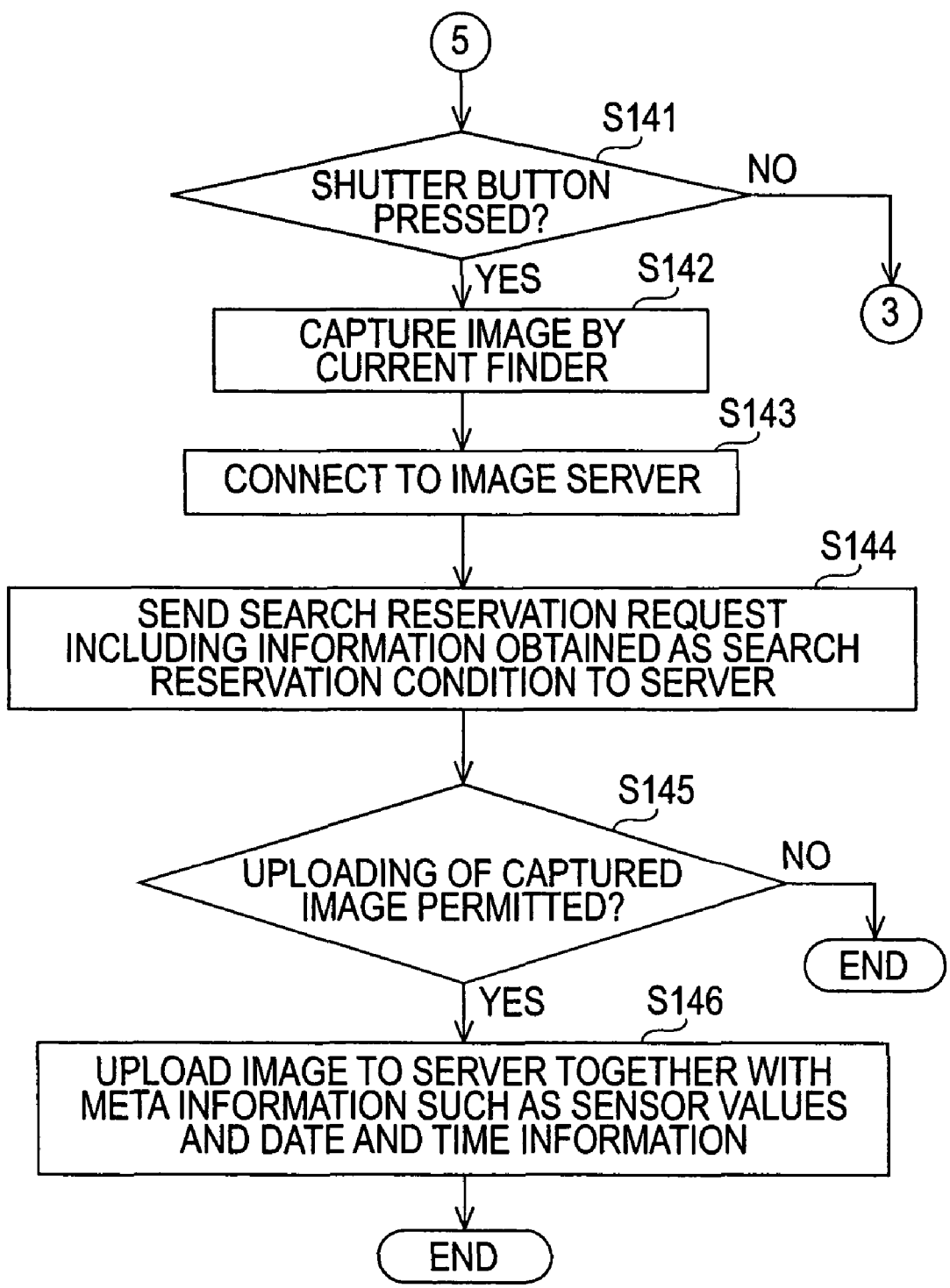
FIG. 9 is a part of the flowchart for explaining the processing operation executed by the digital camera as the example of the client apparatus in the time-shift image distribution system according to the embodiment.
Figure 10:
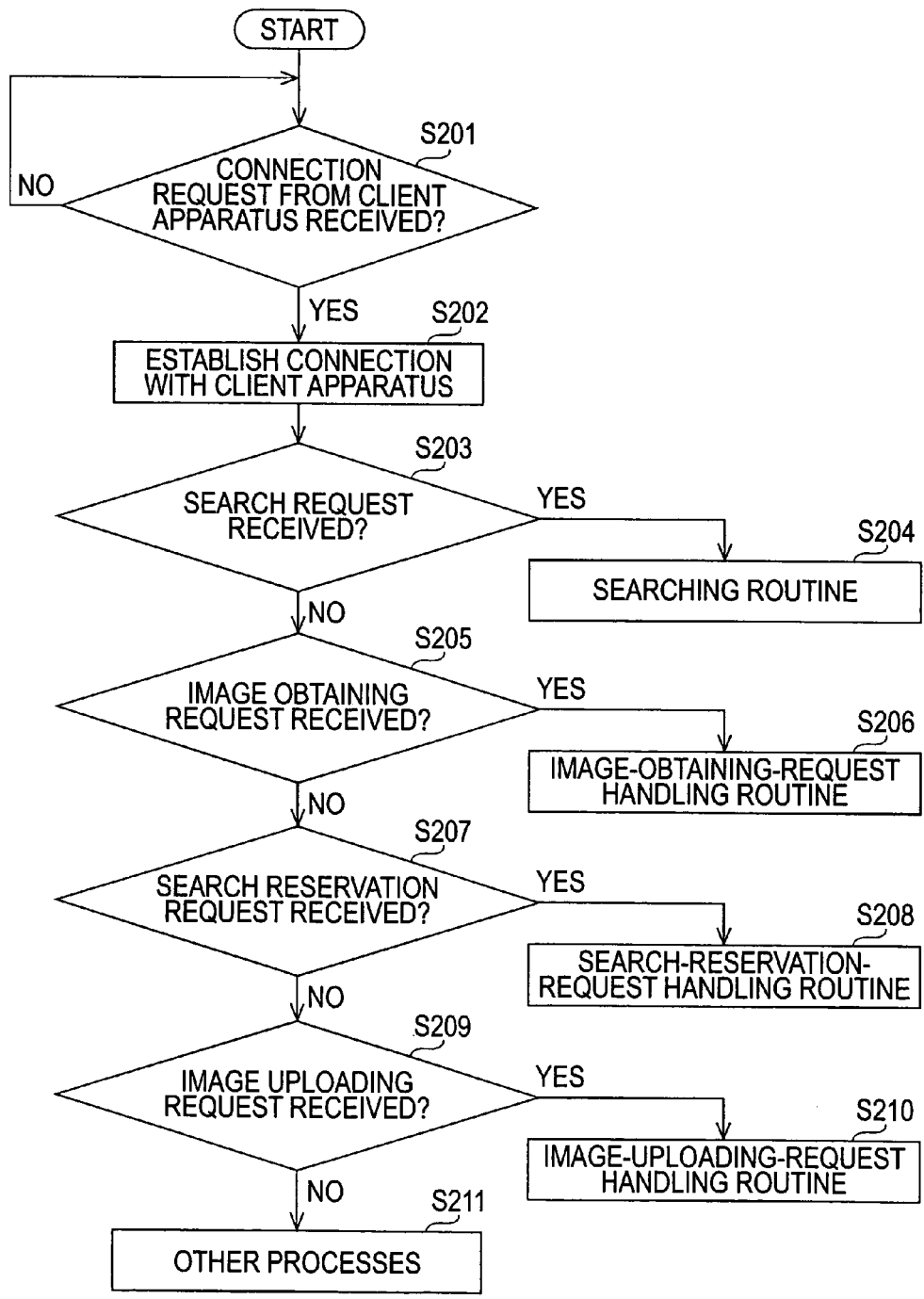
FIG. 10 is a flowchart of a processing operation executed by the image server in the time-shift image distribution system according to the embodiment.

When it is determined in step S11 shown in FIG. 7 that the imaging time specified by the user is a future time, in step S141 shown in FIG. 9, as opposed to the case of a past time, the CPU 201 does not send a search request to the image server 1 at this time, and checks whether the shutter button has been pressed.

When it is determined in step S141 that the shutter button has not been pressed, returning to step S110, the CPU 201 executes subsequent steps described earlier.

On the other hand, when it is determined in step S141 that the shutter button has been pressed, in this embodiment, in step S142, the CPU 201 captures an image of the present view currently displayed on the LCD screen 208D to obtain image data, also obtains meta information, and writes the image data and the meta information to the non-volatile memory 211 for recording captured images. Then, in step S143, the CPU 201 accesses the image server 1 via the network interface 210 and the communication network 3 to establish a communication path with the image server 1.

After establishing a communication path with the image server 1, in step S144, the CPU 201 sends a search reservation request to the image server 1, the search reservation request including the pieces of information obtained from the sensors 214 to 216 and the GPS positioning unit 217 and the specification of imaging time and range as search-condition information.

In step S145, the CPU 201 checks whether the setting permits uploading of captured images. When it is determined that the setting permits uploading, in step S146, the CPU 201 sends an image uploading request to the image server 1, and sends the image data and meta information of the captured image of the present view, recorded in step S142, to the image server 1. The CPU 201 then exits the processing routine.

When it is determined in step S145 that the setting does not permit uploading of captured images, the CPU 201 skips step S146 and immediately exits the processing routine.

In steps S136 and S145, whether uploading is permitted is checked assuming that the user specifies in advance whether to permit uploading of captured images to the image server 1. Alternatively, as described earlier, each time the user presses the shutter button, the user may be asked whether to permit uploading of the captured image to the image server 1, for example, via the LCD screen 208D, so that whether to upload the captured image can be determined in accordance with a user's response as to whether to permit uploading.

Flowcharts of Operations of the Image Server 1

Next, processing operations executed by the image server 1 will be described with reference to flowcharts shown in FIGS. 10 to 14.

In step S201, the CPU 101 of the image server 1 checks whether a connection request for establishing a communication path from the client apparatus 2, e.g., the digital camera 21, has been received. When it is determined that a connection request for establishing a communication path from the client apparatus 2 has been received, in step S202, the CPU 101 establishes a communication path with the client apparatus 2.

In step S203, the CPU 101 checks whether a search request (a search request including a past imaging time in search-condition information) from the client apparatus 2 has been received. When it is determined that a search request has been received, in step S204, the CPU 101 executes a searching routine for handling the search request. The searching routine will be described later.

When it is determined in step S203 that a search request from the client apparatus 2 has not been received, in step S205, the CPU 101 checks whether an image obtaining request has been received. When it is determined that an image obtaining request has been received, in step S206, the CPU 101 executes a processing routine for handling the image obtaining request.

When it is determined in step S205 that an image obtaining request from the client apparatus 2 has not been received, in step S207, the CPU 101 checks whether a search reservation request (a search request including a future imaging time in search-condition information) has been received. When it is determined that a search reservation request has been received, in step S208, the CPU 101 executes a processing routine for handling the search reservation request.

Instead of letting the image server 1 determine whether a search request is a search reservation request on the basis of whether imaging-time information included in search condition information represents a future time, in a search request, the client apparatus 2 may include information representing distinction between a search request for a past captured image and a search reservation request for a future captured image.

When it is determined in step S207 that a search reservation request from the client apparatus 2 has not been received, in step S209, the CPU 101 checks whether an uploading request for uploading a captured image has been received. When it is determined that an uploading request has been received, in step S210, the CPU 101 executes a processing routine for handling the uploading request.

When it is determined in step S209 that an uploading request from the client apparatus 2 has not been received, in step S211, the CPU 101 executes other processes.

Figure 11:
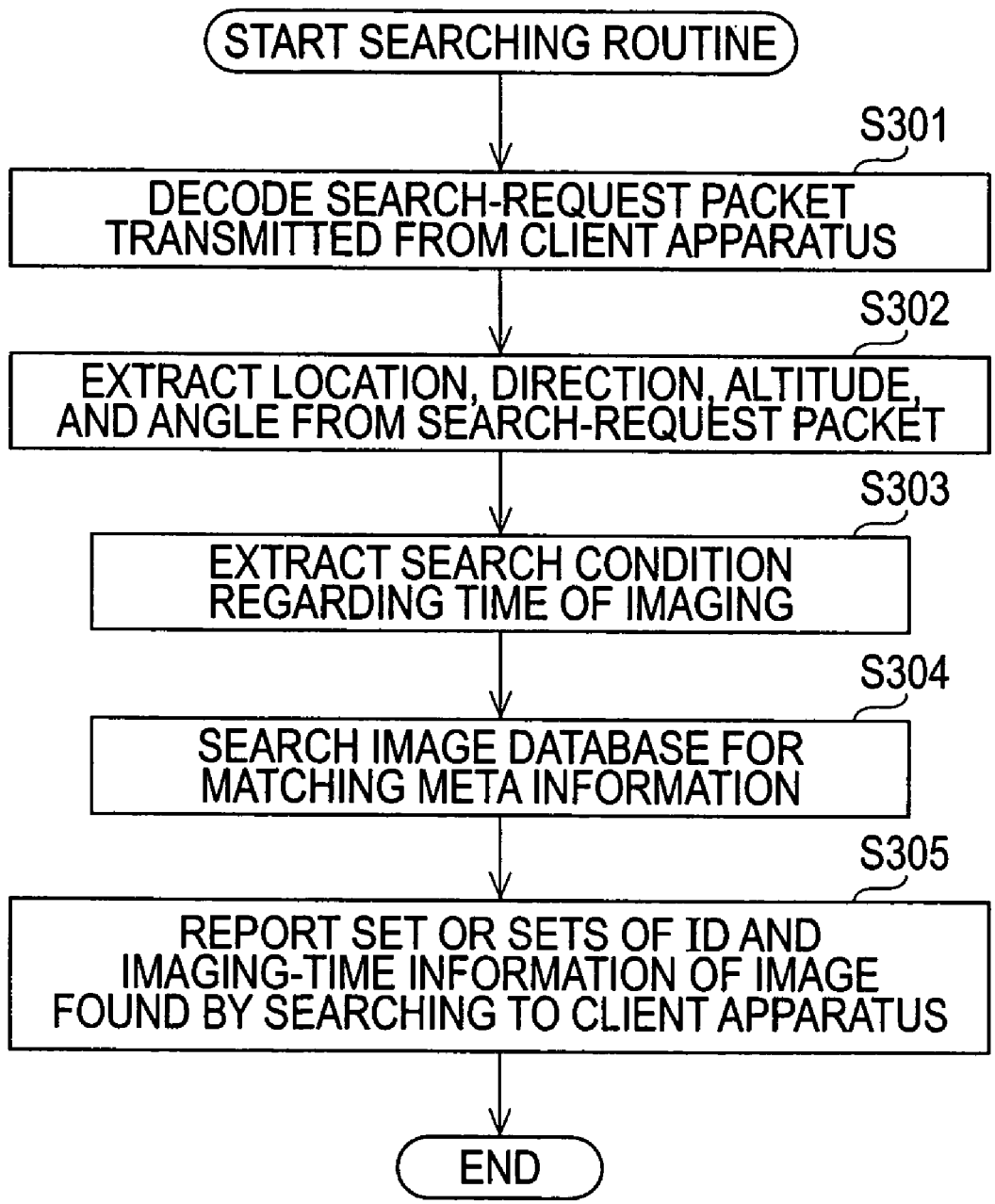
FIG. 11 is a flowchart of a processing operation executed by the image server in the time-shift image distribution system according to the embodiment.

FIG. 11 is a flowchart of a searching routine for handling a search request, executed by the image server 1 in step S204 described earlier.

First, in step S301, the CPU 101 decodes a packet of the search request transmitted from the client apparatus 2. Then, in step S302, the CPU 101 obtains search-condition information regarding an imaging location, an imaging direction, an altitude, and a camera angle, included the packet of the search request. Furthermore, in step S303, the CPU 101 obtains search-condition information regarding imaging time, i.e., a range of imaging time, included in the packet of the search request.

In step S304, the CPU 101 searches for a captured image matching the search-condition information obtained in steps S302 and S303 with reference to the meta information stored in the image database 11. In this embodiment, the searching is performed not only within the range of imaging time obtained in step S303 but over a predetermined period extending before and after the range of imaging time. This is so arranged in consideration of the manner of representation on the navigation bar 403 so that the existence of captured images is indicated not only within the specified range of imaging time but over a range extending before and after the specified range. Thus, when the representation on the navigation bar 403 need not be considered, searching may be executed only within the imaging-time range obtained in step S303.

In step S305, the CPU 101 sends an image ID and imaging-time information of the captured image matching the search-condition information, detected in step S304, to the client apparatus 2 at the source of the search request. When a plurality of captured images matching the search-condition information exists, the CPU 101 sends the image IDs and imaging-time information of the individual captured images to the client apparatus 2. Then, the CPU 101 exists the processing routine.

Figure 12:
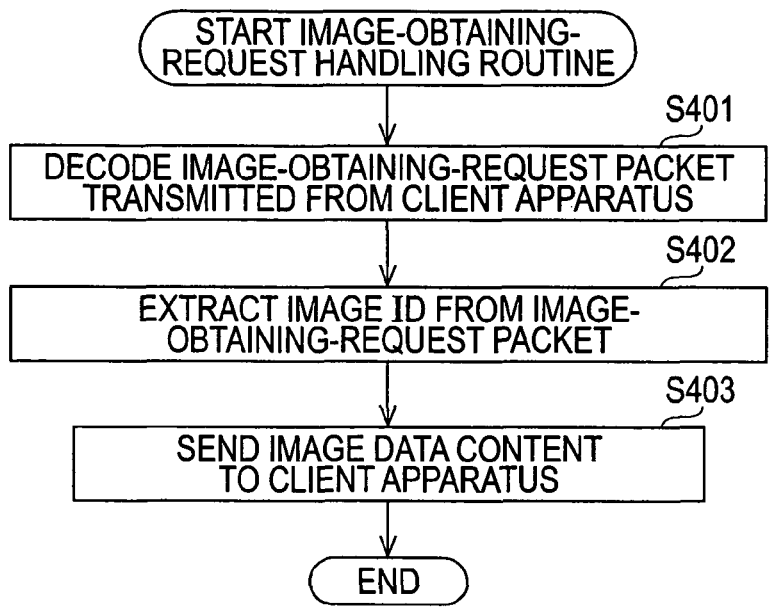
FIG. 12 is a flowchart of a processing operation executed by the image server in the time-shift image distribution system according to the embodiment.

FIG. 12 is a flowchart of a processing routine that is executed in step S206 described earlier in response to an image obtaining request transmitted from the client apparatus 2.

First, in step S401, the CPU 101 decodes a packet of the image obtaining request, transmitted from the client apparatus 2. Then, in step S402, the CPU 101 extracts the image ID of the captured image requested by the client apparatus 2, included in the packet of the image obtaining request. Then, in step S403, the CPU 101 reads image data corresponding to the image ID from the image database 11, and sends the image data to the client apparatus 2 via the communication network 3. The CPU 101 then exits the processing routine.

Figure 13:
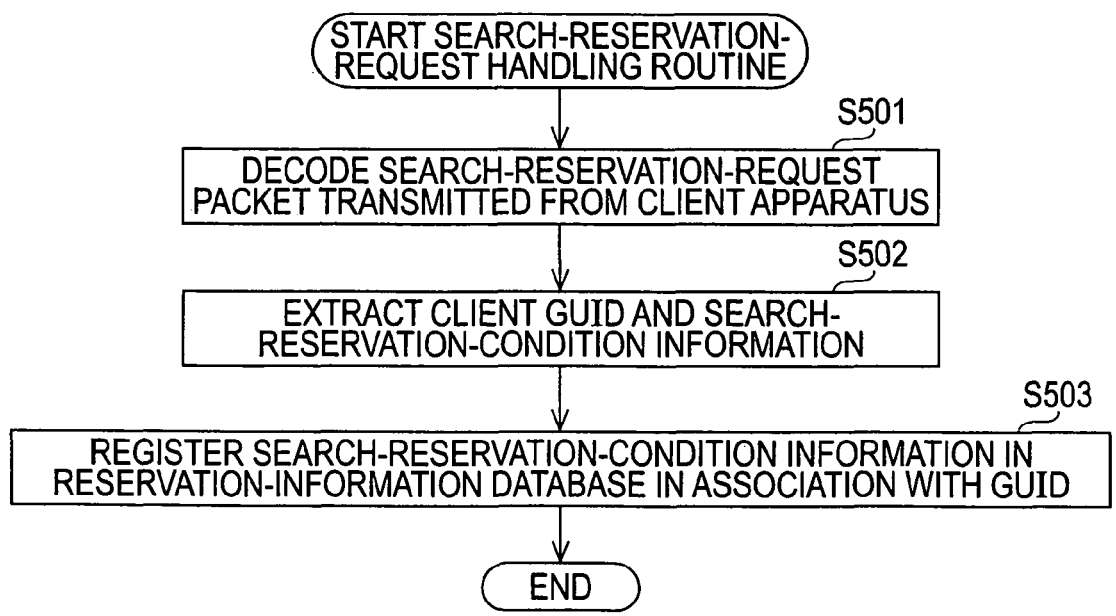
FIG. 13 is a flowchart of a processing operation executed by the image server in the time-shift image distribution system according to the embodiment.

FIG. 13 is a flowchart of a routine for handling a search reservation request, executed in step S208 described earlier.

First, in step S501, the CPU 101 decodes a packet of the search reservation request, transmitted from the client apparatus 2. Then, in step S502, the CPU 101 extracts a camera GUID that serves as identification information of the client apparatus 2 from the packet of the search reservation request, and also extracts search-reservation-condition information (such as an imaging location, an imaging direction, a camera angle, and an imaging time). Then, in step S503, the CPU 101 stores the camera GUID and the search-reservation-condition information in the reservation information database 12 in association with each other. The CPU 101 then exits the processing routine.

Figure 14:
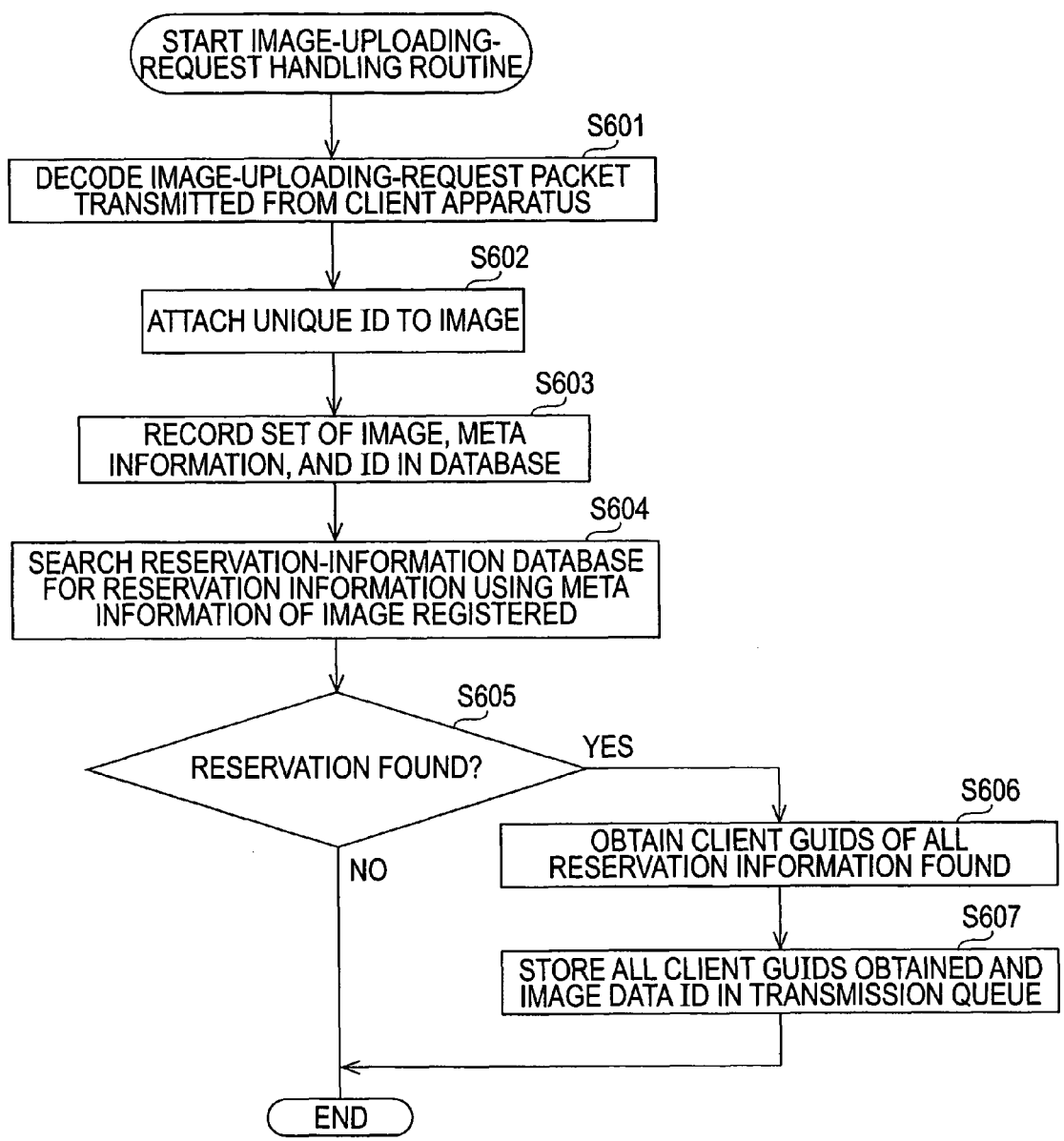
FIG. 14 is a flowchart of a processing operation executed by the image server in the time-shift image distribution system according to the embodiment.

FIG. 14 is a flowchart of a routine for handling an image uploading request, executed in step S210 described earlier.

Firs, in step S601, the CPU 101 decodes a packet of the image uploading request, transmitted from the client apparatus 2. Then, in step S602, the CPU 101 assigns identification information (an image ID) to the uploaded image included in the packet. When identification information is already assigned to the uploaded image included in the packet of the image uploading request transmitted from the client apparatus 2, obviously, the image ID itself may be used.

Then, in step S603, the CPU 101 stores the uploaded image data and meta information in the image server 1 in association with each other on the basis of the image ID assigned in step S602.

Then, in step S604, the CPU 101 searches the reservation information database 12 for a search reservation request using the meta information stored in the image database 11 in the current session. Then, in step S605, the CPU 101 checks whether search-reservation-condition information included in the search reservation request matches the meta information of the image data stored in the current session.

When matching search reservation requests are detected in step S605, in step S606, the CPU 101 obtains all the camera GUIDs of the matching search reservation requests, stored in the reservation information database 12.

In step S607, the CPU 101 stores all the camera GUIDs obtained in step S606 and the image ID to send in the image-transmission-queue storage unit 15. The CPU 101 then exits the processing routine. When no matching search reservation request is detected in step S605, the CPU 101 immediately exists the processing routine.

As described above, according to this embodiment, the concept of imaging with a camera that it is not possible to capture an image of the past or the future is radically revoked, and it becomes possible to virtually provide a user with an experience of capturing images beyond restriction of time in addition to just capturing an image of the present.

In view of the explosive increase in the volume of image content captured by individual users in accordance with the recent rapid spread of digital cameras and camera-equipped cellular phones, this embodiment could potentially develop totally new ways of using images through the use of the image content resources and change the culture of enjoying capturing images.

In the embodiment described above, a search range regarding imaging time is defined by a certain range instead of a point of time. Similarly, regarding imaging location, imaging direction, altitude, and camera angle, instead of using values detected by sensors or the like directly as search-condition information, regarding each of these parameters, a certain range with respect to a value detected by a sensor or the like may be used as search-condition information. In that case, for each of the imaging location, the imaging direction, the altitude, and the camera angle, a fixed search range may be predefined in advance, or the user may be allowed to specify a search range similarly to the case of imaging time described earlier.

Thus, for example, instead of specifying an imaging direction of North as a search condition, it is possible to specify a range of imaging direction from North East to North West. By increasing the search range, the number of images matching the search condition increases.

Although the embodiment has been described in the context of a case where still images are captured by a digital camera, application to a case where moving images are captured is also possible.

Although the embodiment is described in the context of a digital camera, application to a camera-equipped cellular phone terminal is also possible. Furthermore, application to a personal digital assistant (PDA) or a portable personal computer including a camera is also possible.

It is also possible to receive the image providing service through registration of membership in an image providing service company having an image server. In that case, a GUID need not be assigned to a client apparatus, and membership identification information such as a membership number may be used instead of a GUID.

Although the client apparatus in the embodiment described above includes an imaging unit, an imaging unit need not necessarily be included. For example, a PDA or a personal computer may send a search request including search-condition information such as an imaging time, an imaging location, and an imaging direction input by a user to an image server and receive search-result information from the image server.

The method of providing a requested image from an image server is not limited to sending image data via a communication network to a client apparatus as in the embodiment described above, and a printout of an image may be delivered to a user of a client apparatus, for example, by mail.

As for search-condition information, information for identifying an image other than imaging-time information may be of any type as long as the information is accumulated in the image server as meta information. For example, when the user wishes to include the name of a location or architecture, such as "Asakusa", "Kaminarimon", or "Tokyo Tower" to an image captured by the user in meta information, searching based on these names becomes possible.

The image server or the client apparatus may have a function of performing image recognition on a captured image, and, when an image including a specific architecture is recognized, automatically registering the name of the architecture in meta information in association with the image data.

It should be understood by those skilled in the art that various modifications, combinations, sub-combinations and alterations may occur depending on design requirements and other factors insofar as they are within the scope of the appended claims or the equivalents thereof.

What is claimed is:

1. A time-shift image distribution system comprising:
an image server; and
a time-shift image requesting apparatus configured to request the image server to provide a time-shift image of a non-present time, the time-shift image requesting apparatus being connected to the image server via a communication network;
wherein the image server comprises:
first communication means for carrying out communications with the time-shift image requesting apparatus via the communication network,
an image database configured to store image data of captured images in association with meta information including information representing imaging times and information for identifying subject images captured,
searching means for searching the image database based on a search request received from the time-shift image requesting apparatus via the first communication means, the search request at least including information representing an imaging time and information for identifying a subject image as search-condition information, the searching means searching the image database for image data of a captured image matching the search-condition information,
image providing means for providing image data of a captured image detected by the searching means to the time-shift image requesting apparatus,
reservation means for saving, as a search reservation request, a future time search request received from the time-shift image requesting apparatus via the first communication means, wherein search-condition information of the future time search request includes information representing a future imaging time, and
an image-transmission-queue storage unit that, based on the search reservation request, searches the image database at a future time to identify image data matching the search-condition information and, when image data matching the search-condition information becomes available, provides the image data to the time-shift image requesting apparatus,
wherein the time-shift image requesting apparatus comprises:
second communication means for carrying out communications with the image server via the communication network, and
means for sending a search request including information representing an imaging time and information for identifying a subject image as search-condition information to the image server via the second communication means, wherein the information for identifying a subject image includes location-range information representing a location range with reference to a geographical location of the time-shift image requesting apparatus.

2. The time shift image distribution system according to claim 1, wherein the information representing the imaging time, included in the search-condition information, represents a past time,
wherein the image providing means of the image server is configured to send the image data of the captured image detected by the searching means as matching the search-condition information to the time-shift image requesting apparatus via the communication network using the first communication means, and
wherein the time-shift image requesting apparatus further comprises means for receiving the image data transmitted from the image server via the communication network and for displaying an image corresponding to the image data.

3. The time-shift image distribution system according to claim 1, wherein the information representing the imaging time, included in the search-condition information, represents a past time, wherein the image server further comprises means for sending information at least including information representing a presence or absence of a subject image matching the search-condition information to the time-shift image requesting apparatus as a result of searching by the searching means,
wherein the image providing means is configured to execute processing for providing the time-shift image requesting apparatus with the image data of the captured image detected by the searching means in response to an image obtaining request transmitted from the time-shift image requesting apparatus, and
wherein the time-shift image requesting apparatus further comprises means for displaying the information representing the presence or absence of a subject image matching the search-condition information on a display screen and means for sending the image obtaining request for the captured image matching the search-condition information.

4. The time-shift image distribution system according to claim 1,
wherein the image database of the image server is configured to allow adding and accumulating image data of new captured images, and the searching means searches the image database for image data of a captured image matching the search-condition information of the search reservation request.

5. The time-shift image distribution system according to claim 1,
wherein the time-shift image requesting apparatus further comprises location-information obtaining means for obtaining geographical-location information representing a geographical location, and the time-shift image requesting apparatus is configured to send the location-range information to the image server as the information representing the imaging location, the location-range information representing a location range with reference to the geographical location represented by the geographical-location information obtained by the location-information obtaining means.

6. The time-shift image distribution system according to claim 5,
wherein the time-shift image requesting apparatus further comprises direction detecting means for detecting a direction in addition to the location-information obtaining means for obtaining geographical-location information, and the time-shift image requesting apparatus is configured to send direction-range information in addition to the location-range information to the image server as the information for identifying a subject image, included in the search-condition information, the direction-range information representing a direction range with reference to the direction detected by the direction detecting means.

7. The time-shift image distribution system according to claim 6, wherein the time-shift image requesting apparatus further comprises user input means for allowing a user to set and change the location range and the direction range.

8. The time-shift image distribution system according to claim 5, wherein the time-shift image requesting apparatus further comprises:

an imaging device, a display having a display screen, means for sending the search request to the image server via the communication network at a timing before a shutter button is pressed, the information representing the imaging time, included in the search-condition information, representing a past time, means for receiving information at least including a presence or absence of a captured image matching the search-condition information, transmitted from the image server via the communication network as a result of searching, and for displaying the information on the display screen of the display, means for sending a request for obtaining the captured image matching the search-condition information according to the result of searching to the image server via the communication network when the shutter button is pressed, and means for displaying the captured image matching the search-condition information, transmitted from the image server via the communication network, on the display screen, and wherein the image server further comprises means for sending information at least including information representing the presence or absence of a captured image matching the search-condition information to the time-shift image requesting apparatus via the communication network as a result of searching by the searching means, based on the search request transmitted from the time-shift image requesting apparatus, and wherein the image providing means is configured to send image data of the captured image to the time-shift image requesting apparatus via the communication network, the captured image being detected by the searching means in response to the image obtaining request transmitted from the time-shift requesting apparatus.

9. The time-shift image distribution system according to claim 8, wherein the time-shift image requesting apparatus further comprises means for actually carrying out imaging by the imaging device when the shutter button is pressed, and for uploading image data of a captured image obtained by the imaging to the image server together with meta information at least including information representing a date of imaging, an imaging location, and an imaging direction when uploading to the image server is permitted, and wherein the image server includes means for accumulating the uploaded image data and meta information of the captured image in association with each other in the image database.

10. The time-shift image distribution system according to claim 5, wherein the time-shift image requesting apparatus further comprises:

an imaging device, a display having a display screen, and means for sending the search request to the image server via the communication network at a timing when a shutter button is pressed, the information representing the imaging time, included in the search-condition information, representing a future time, and wherein the image server includes means for saving the search request transmitted from the time-shift image requesting apparatus as a search reservation request, and the searching means searches the image database for image data of a captured image matching the search-condition information in the search reservation request.

11. The time-shift image distribution system of claim 1, wherein the time-shift image requesting apparatus further comprises means for determining whether the imaging time is a past imaging time or a future imaging time.

12. A time-shift image distribution method executed by an image server and a time-shift image requesting apparatus connected via a communication network, the image server comprising an image database configured to accumulate image data of captured images in association with meta information including information representing imaging times and information for identifying subject images, wherein the time-shift image requesting apparatus requests the image server to provide a time-shift image of a non-present time to receive the time-shift image from the image server, the time-shift image distribution method comprising the steps of:

establishing, by the time-shift image requesting apparatus, a communication path for carrying out communications with the image server via the communication network;

sending, by the time-shift image requesting apparatus, a search request to the image server through the communication path established, the search request including information representing an imaging time and information for identifying a subject image as search-condition information;

searching, by the image server, the image database for image data of a captured image matching search-condition information included in a search request received from the time-shift image requesting apparatus via the communication path, the search-condition information including information representing an imaging time and information for identifying a subject image, wherein the information for identifying a subject image includes location-range information representing a location range with reference to a geographical location of the time-shift image requesting apparatus;

providing, by the image server, the image data of the captured image, detected by the searching, to the time-shift image requesting apparatus;

saving on a computer-readable storage medium, by the image server, as a search reservation request, a future time search request received from the time-shift image requesting apparatus via the communication path, wherein search-condition information of the future time search request includes information representing a future imaging time;

at the image server, monitoring whether image data matching the search-condition information exists in the image database; and when image data matching the search-condition information becomes available at a future time, providing the image data to the time-shift image requesting apparatus.

13. The time-shift image distribution method of claim 12, further comprising:
determining, by the time-shift image requesting apparatus, whether the imaging time is a past imaging time or a future imaging time.

14. An image server, connected to a time-shift image requesting apparatus via a communication network, for receiving a request for providing a time-shift image of a non-present time from the time-shift image requesting apparatus and providing the time-shift image to the time-shift image requesting apparatus, the image server comprising:
communication means for carrying out communications with the time-shift image requesting apparatus via the communication network;
an image database configured to accumulate image data of captured images in association with meta information including information representing imaging times and information for identifying subject images;
searching means for searching the image database based on a search request received from the time-shift image requesting apparatus via the communication means, the search request at least including information representing an imaging time and information for identifying a subject image as search-condition information, the searching means searching the image database for a captured image matching the search-condition information, wherein the information for identifying a subject image includes location-range information representing a location range with reference to a geographical location of the time-shift image requesting apparatus;
image providing means for providing image data of the captured image detected by the searching means to the time-shift image requesting apparatus;
reservation means for saving, as a search reservation request, a future time search request received from the time-shift image requesting apparatus via the communication means, wherein search-condition information of the future time search request includes information representing a future imaging time; and
an image-transmission-queue storage unit that, based on the search reservation request, searches the image database at a future time to identify image data matching the search-condition information and, when image data matching the search-condition information becomes available, provides the image data to the time-shift image requesting apparatus.

15. The image server according to claim 14,
wherein the information representing the imaging time, included in the search-condition information, represents a past time, and
wherein the image server further comprises means for sending information including at least information representing the presence or absence of a captured image matching the search-condition information to the time-shift image requesting apparatus as a result of searching by the searching means.

16. The image server according to claim 14,
wherein the image database is configured to allow adding and accumulating image data of new captured images, and
wherein the searching means searches the image database for image data of a captured image matching the search-condition information of the search reservation request.

17. The image server according to claim 14,
wherein the information for identifying a subject image, included in the search-condition information, further includes direction-range information representing a direction range with reference to a direction of the time-shift image requesting apparatus.

18. A time-shift image distribution system comprising:
an image server; and
a time-shift image requesting apparatus configured to request the image server to provide a time-shift image of a non-present time, the time-shift image requesting apparatus being connected to the image server via a communication network;
wherein the image server comprises:
a first communication unit configured to carry out communications with the time-shift image requesting apparatus via the communication network,
an image database configured to store image data of captured images in association with meta information including information representing imaging times and information for identifying subject images captured,
a searching unit configured to search the image database based on a search request received from the time-shift image requesting apparatus via the first communication unit, the search request at least including information representing an imaging time and information for identifying a subject image as search-condition information, the searching unit searching the image database for image data of a captured image matching the search-condition information, wherein the information for identifying a subject image includes location-range information representing a location range with reference to a geographical location of the time-shift image requesting apparatus,
an image providing unit configured to provide the image data of the captured image detected by the searching unit to the time-shift image requesting apparatus,
a reservation unit configured to save, as a search reservation request, a future time search request received from the time-shift image requesting apparatus via the first communication unit, wherein search-condition information of the future time search request includes information representing a future imaging time,
an image-transmission-queue storage unit that, based on the search reservation request, searches the image database at a future time to identify image data matching the search-condition information and, when image data matching the search-condition information becomes available, provides the image data to the time-shift image requesting apparatus, and
wherein the time-shift image requesting apparatus comprises:
a second communication unit configured to carry out communications with the image server via the communication network, and
a unit configured to send a search request including information representing an imaging time and information for identifying a subject image as search-condition information to the image server via the second communication unit.

19. The time-shift image distribution system of claim 18, wherein the time-shift image requesting apparatus further comprises a second unit configured to determine whether the imaging time is a past imaging time or a future imaging time.

* * * * *